United States Patent [19]

Tsuboi et al.

[11] Patent Number: 5,124,799
[45] Date of Patent: Jun. 23, 1992

[54] DIGITAL COLOR COPYING MACHINE FOR FORMING A PLURALITY OF IMAGES OF THE SAME IMAGE

[75] Inventors: Toshio Tsuboi, Okazaki; Keiji Nakatani; Shigeru Moriya, both of Toyokawa, all of Japan

[73] Assignee: Minolta Camera Kabushiki Kaisha, Osaka, Japan

[21] Appl. No.: 564,880

[22] Filed: Aug. 9, 1990

[30] Foreign Application Priority Data

Aug. 11, 1989 [JP] Japan ............... 1-209093
Aug. 11, 1989 [JP] Japan ............... 1-209094
Aug. 11, 1989 [JP] Japan ............... 1-209095
Aug. 11, 1989 [JP] Japan ............... 1-209096
Aug. 11, 1989 [JP] Japan ............... 1-209097

[51] Int. Cl.⁵ .................. H04N 1/21; H04N 1/23; H04N 1/387
[52] U.S. Cl. .................. 358/296; 358/401; 358/450; 358/451; 358/453
[58] Field of Search ............... 358/296, 401, 451, 449, 358/450, 452, 453

[56] References Cited

U.S. PATENT DOCUMENTS

| | | |
|---|---|---|
| 4,275,958 | 6/1981 | Tachika et al. |
| 4,387,297 | 6/1983 | Swartz et al. |
| 4,603,262 | 7/1986 | Eastman et al. |
| 4,674,861 | 6/1987 | Kawamura |
| 4,755,852 | 7/1988 | Fujita |
| 4,794,419 | 12/1988 | Shibazaki et al. |
| 4,825,246 | 4/1989 | Fukuchi et al. |
| 4,875,173 | 10/1989 | Nakajima |
| 4,876,571 | 10/1989 | Nakamura et al. |
| 4,893,194 | 1/1990 | Sakata ............... 358/451 |
| 4,899,227 | 2/1990 | Yamada ............... 358/451 |
| 4,947,269 | 8/1990 | Yamada ............... 358/451 |

FOREIGN PATENT DOCUMENTS

| | | |
|---|---|---|
| 49-131317 | 12/1974 | Japan |
| 54-104834 | 8/1979 | Japan |
| 55-123270 | 9/1980 | Japan |
| 56-83757 | 7/1981 | Japan |
| 57-61372 | 4/1982 | Japan |
| 60-216670 | 4/1984 | Japan |
| 60-239764 | 11/1985 | Japan |
| 63-14177 | 1/1988 | Japan |
| 1-126074 | 5/1989 | Japan |

Primary Examiner—Benjamin R. Fuller
Assistant Examiner—Scott A. Rogers
Attorney, Agent, or Firm—Burns, Doane, Swecker & Mathis

[57] ABSTRACT

A digital color copying machine includes, reading means for reading an original image to produce digital image data, area designating means for designating an area of the original image; memory means for storing the image data; writing means for writing the image data located on the specific area into the memory means, reading-out means for reading out the image data stored in the memory means; sheet size designating means, and size setting means for setting the size of the unit image to be printed on the copying sheet. The image data of a partial or entire portion of an original are once stored in the memory and repeatedly read out, whereby a plurality of the same images can be formed on a plurality of portions of a copying sheet, and the number and direction of the images to be formed can be designated monitoring the display thereof.

9 Claims, 18 Drawing Sheets

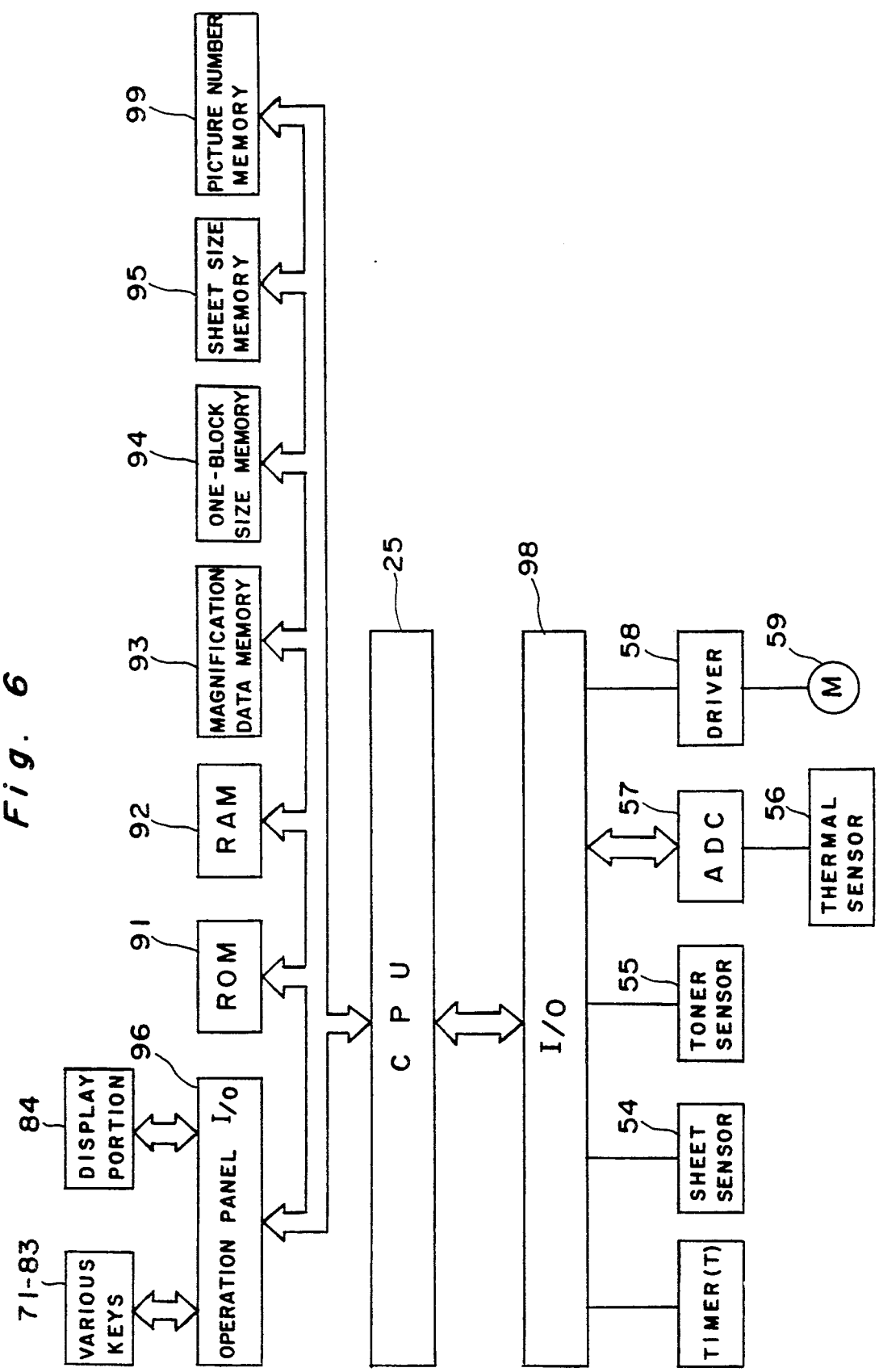

Fig. 13(a)
MEMORY READ CLOCK
MEMORY READ DATA 
PRINT CLOCK
PRINT DATA 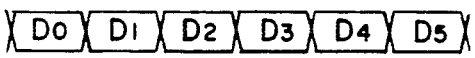
Fig. 13(b)
MEMORY READ CLOCK
MEMORY READ DATA 
PRINT CLOCK
PRINT DATA 

DIGITAL COLOR COPYING MACHINE FOR FORMING A PLURALITY OF IMAGES OF THE SAME IMAGE

BACKGROUND OF THE INVENTION

1. Field of the Invention

The present invention relates to a digital copying machine, and more particularly to a digital copying machine in which a plurality of images of a partial or entire portion of an original can be reproduced on a plurality of portions on a surface of a copying sheet through one printing process.

2. Description of the Prior Art

Conventionally, in the Japanese Patent Laid Open Publication Sho 63-14177, there has been disclosed a copying machine for serially forming a plurality of the same images from a single image of an original on a copying sheet the size of which is larger than that of the original. In this copying machine, there are provided a plurality of projection lenses arranged in parallel so as to project a plurality of original images in a lateral direction on a surface of a photosensitive drum, and a special technique is required in this copying operation. Moreover, in this copying machine, since the photosensitive drum with an original wound thereon is rotated and the same images of the original are serially projected onto the photosensitive drum, there has been a problem that, an original of a different size can not be used in this copying machine, still less a plurality of the same images of a specified portion of an original can not be reproduced on a plurality of regions of a copying sheet through one printing process.

SUMMARY OF THE INVENTION

An object of the present invention is to provide a digital copying machine in which a plurality of the same images of a partial or entire portion of a single original can be reproduced on a plurality of portions on a surface of a copying sheet through one time of printing process.

Another object of the present invention is to provide a digital copying machine in which the number of the output images to be formed can be so controlled that any one of the serial images is not divided when a plurality of the same images are reproduced on a plurality of regions of a copying sheet.

Further another object of the present invention is to provide a digital copying machine in which a plurality of images obtained by changing a size of an image of an original at various magnification and/or reduction rates can be reproduced on a plurality of regions on a copying sheet.

Still another object of the present invention is to provide a digital copying machine in which the number of a plurality of the same images to be formed can be displayed when the same images are reproduced on a plurality of regions on a copying sheet.

Still more another object of the present invention is to provide a digital copying machine in which the size of the unit image to be formed on a copying sheet can be designated when a plurality of the same images are reproduced on a plurality of regions on a copying sheet.

Further still another object of the present invention is to provide a digital copying machine in which the number and direction of a plurality of the same images to be formed can be designated when the same images are reproduced on a plurality of regions on a copying sheet.

In order to accomplish the objects mentioned above, a digital copying machine according to the present invention includes: reading means for reading an original image so as to produce digital image data; area designating means for designating an area of the original image; memory means for storing the image data; writing means for writing the image data located on the area designated by the area designating means into the memory means; reading-out means for reading out the image data stored in the memory means; sheet size designating means; size setting means for setting the size of the unit image to be printed on the copying sheet; and printing means for printing the image data read out by the reading-out means on a plurality of regions of the copying sheet.

According to a feature of the present invention, image data of a partial or entire portion of an original are once stored in a memory unit and repeatedly read out, whereby a plurality of the same images can be formed on a plurality of portions of a copying sheet.

According to another feature of the present invention, when a plurality of the same images are formed on a plurality of portions of a copying sheet, the number and direction of the images to be formed can be designated.

The features of the present invention which are believed to be novel are set forth with particularity in the appended claims. The present invention together with further objects and advantages thereof may best be understood with reference to the following detailed description, taken in conjunction with the accompanying drawings.

BRIEF DESCRIPTION OF THE DRAWINGS

FIGS. 1 to 21 show an embodiment of a digital copying machine according to the present invention, wherein FIG. 1 is a schematic sectional view showing a digital machine, FIG. 2 is a block diagram showing a signal processing unit, FIG. 3 is a timing chart of image data processing, FIG. 4 is a front view showing an operation panel, FIG. 5 is a diagram showing an attention area setting process, FIG. 6 is a block diagram showing a control of a printing operation and operation panel, FIG. 7 is a diagram showing an output format of a seal image, FIG. 8 is a diagram showing a display of an output FIG. 9 is a diagram showing a display of a printing condition, FIG. 10 is a diagram showing each parameter in a seal image display output, FIG. 11 is a diagram showing a display of output format and output condition, FIG. 12 is a circuit diagram showing a registered image memory circuit, FIGS. 13(a) an 13(b) are timing charts of variable magnification performed by varying clock signal the image data is read out from the memory, FIG. 14 is a circuit diagram showing an area judging circuit and address generating counter, FIG. 15 is a timing chart showing an operation of the area judging circuit, FIG. 16 is a circuit diagram showing a color tone setting circuit, FIG. 17 is a main flow chart with respect to the seal mode digital color copying machine, FIG. 18 is a flow chart showing an image storing process, FIG. 20 is a flow chart showing an output display number determining process, and FIG. 21 is a flow chart showing an output display.

DETAILED DESCRIPTION OF THE PREFERRED EMBODIMENT

Before the explanation of the present invention precedes, a mosaic mode and a seal mode are first explained hereinafter. In the mosaic mode, a specific attention area including a region which a user especially desires to reproduce the color thereof is set by means for setting a specific region on an original, so that the image data of multi-levels located on the specific attention region are stored in image memory means. Subsequently, color correction is performed on the image data read out of the image memory means with predetermined various different kinds of color levels and these color corrected image data are formed to be printed on a plurality of regions on a single copying sheet, whereby the user selects the most suitable color corrected mosaic monitor image.

On the other hand, in the seal mode, a plurality of the same images of a region of an original can be printed on a plurality of regions on a single copying sheet with the same color correcting balance, wherein the printed pictures are individually cut off to be used as a seal.

A preferred embodiment of the present invention is explained with reference to the accompanying drawings.

In this embodiment, although the explanation is made about the case that an image of a region on an original is serially reproduced on a plurality of regions on the same copying sheet, also in the case that a lot of copies are printed from a small sized original such as B6 size, the image of the original is previously read and stored in a memory, and the stored image data are repeatedly read out, thereby obtaining a plurality of the same images printed on a plurality of regions on the same sheet.

Moreover, in this embodiment, although a digital color copying machine having a mosaic monitor mode is embodied, any type of digital copying machine can be embodied.

(a) CONSTRUCTION OF DIGITAL COLOR COPYING MACHINE

A digital color copying machine of a preferred embodiment according to the present invention comprises a reading portion for reading an original image using an image sensor elements and converting the original image into binary printing output data signals, and a printer portion for printing the image corresponding to the printing output data signals on a copying sheet by using an electrophotographic method. When a multi-color copying operation with a plurality of colors is carried out, the printing operation of the image is performed in such a manner that the image is sequentially printed on the same sheet with respect to each of printing colors so as to form a multicolored image. That is, the reading portion reads the original image corresponding to respective colors of yellow, magenta and cyan and outputs respective color image data to the printer portion. The printer portion forms respective color images according to respective color image data outputted from the reading portion.

Figure 1:
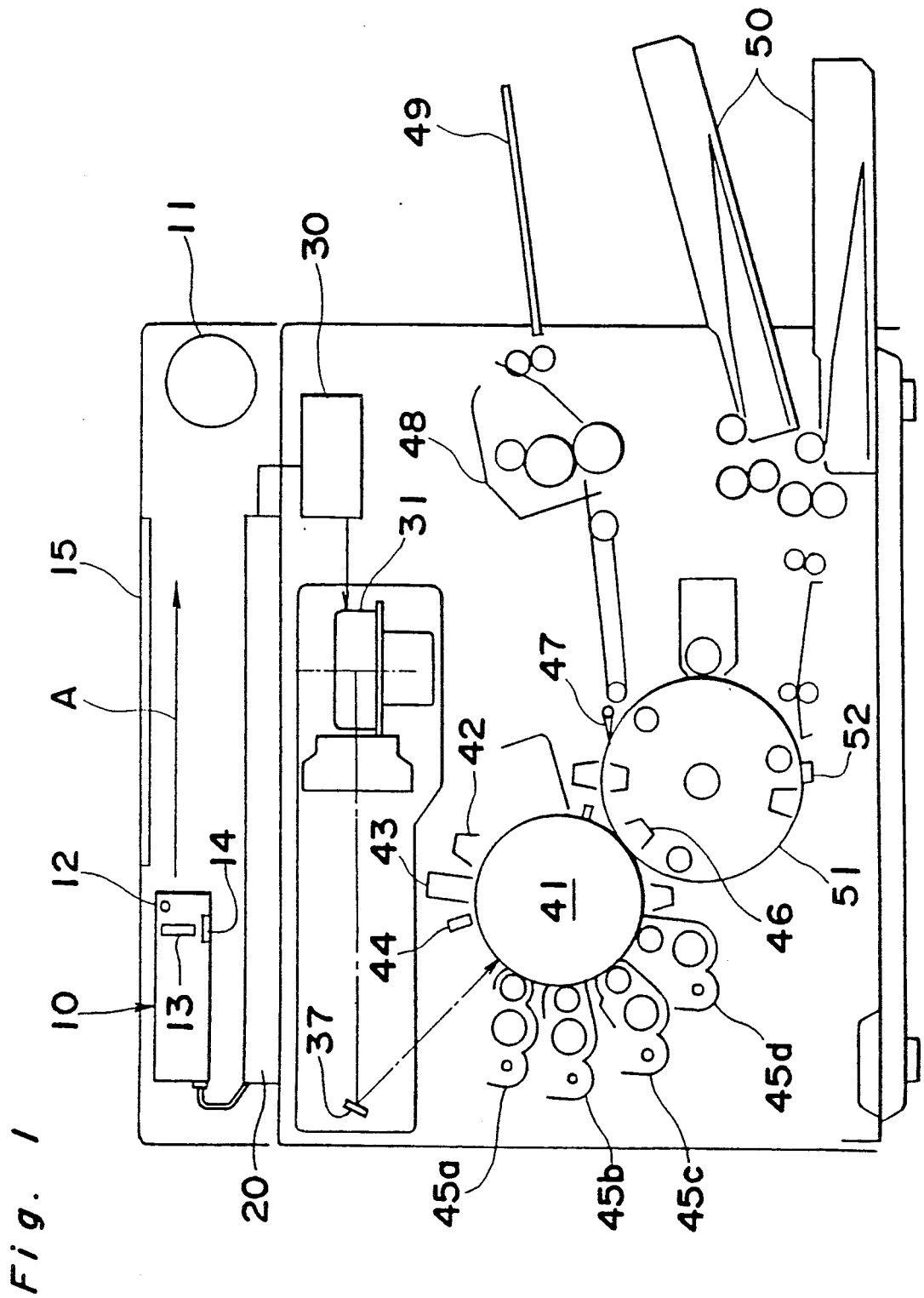

FIG. 1 shows a constitution of a whole part of a digital color copying machine of a preferred embodiment according to the present invention, which is similar to that of a conventional one.

Referring to FIG. 1, a scanner 10 includes an exposure lamp 12 for exposing an original, a rod lens array 13 for focusing the light beams reflected by the original and a contact type CCD color sensor (or image sensor) 14 for photo-electrically converting the focused light beams to electrical signals. When in the operation of reading an original, the scanner 10 is moved in a direction indicated by an arrow mark A by driving a motor 11 so as to scan the original placed on a platen 15. The image data of the surface of the original exposed by the light source 12 is photo-electrically converted into multi-level analogue electric signals of red (R), green (G) and blue (B) colors through the CCD color image sensor 14.

The R. G. B. electric signals of multi-values obtained through the CCD color image sensor 14 are converted into binary print out image data signals of any one of yellow, Magenta (fuchsine), cyan and black colors, and individual color image data are stored in a buffer memory 30. In a print head portion 31, an LD drive unit 32 turns a semiconductor laser (LD) 33 on and off depending on the print out image data signals read out from the buffer memory 30 (see FIG. 2).

The laser beam generated by the semiconductor laser 33 is reflected by a reflection mirror 34 so as to be projected to the surface of the rotating photosensitive drum 41. Hereby, the original image is formed on the surface of the photosensitive drum 41. The photosensitive drum 41 is irradiated by an eraser lamp 42 and is electrically charged by a electrifier charger 43 and is further irradiated by a sub-eraser lamp 44 before the photosensitive drum 41 is exposed in every copying operation. Under this condition, when the photosensitive drum 41 is exposed by the laser beam, there is formed an electrostatic latent image on the photosensitive drum 41. One toner developing unit is selected among four toner developing units 45a to 45d for feeding yellow, magenta, cyan and black toner respectively, so that the electrostatic latent image formed on the photosensitive drum 41 is developed into a visible toner image. The developed toner image is transferred through a transfer charger 46 onto a sheet or paper wound around a surface of a transfer drum 51.

Generally, such an image forming process is repeated with respect to four colors of yellow, magenta, cyan and black toner. In this image forming process, the scanning operation of the scanner 10 is repeated while synchronizing with the rotation of the photosensitive drum 41 and the transfer drum 51. Subsequently, the copying sheet is separated from the transfer drum 51 by operating a separator member 47 so as to be carried to a fixing unit 48. The developed toner image formed on the sheet is fixed through the fixing unit 48 and then the sheet is fed out to a sheet discharge tray 49.

The copying sheet is fed from a sheet cassette 50 and the tip edge of the sheet is chucked by a sheet chucking mechanism 52 which is provided on the transfer drum 51 so that displacement of the sheet is prevented at the time of transferring the toner image onto the transfer drum 51.

Figure 2:
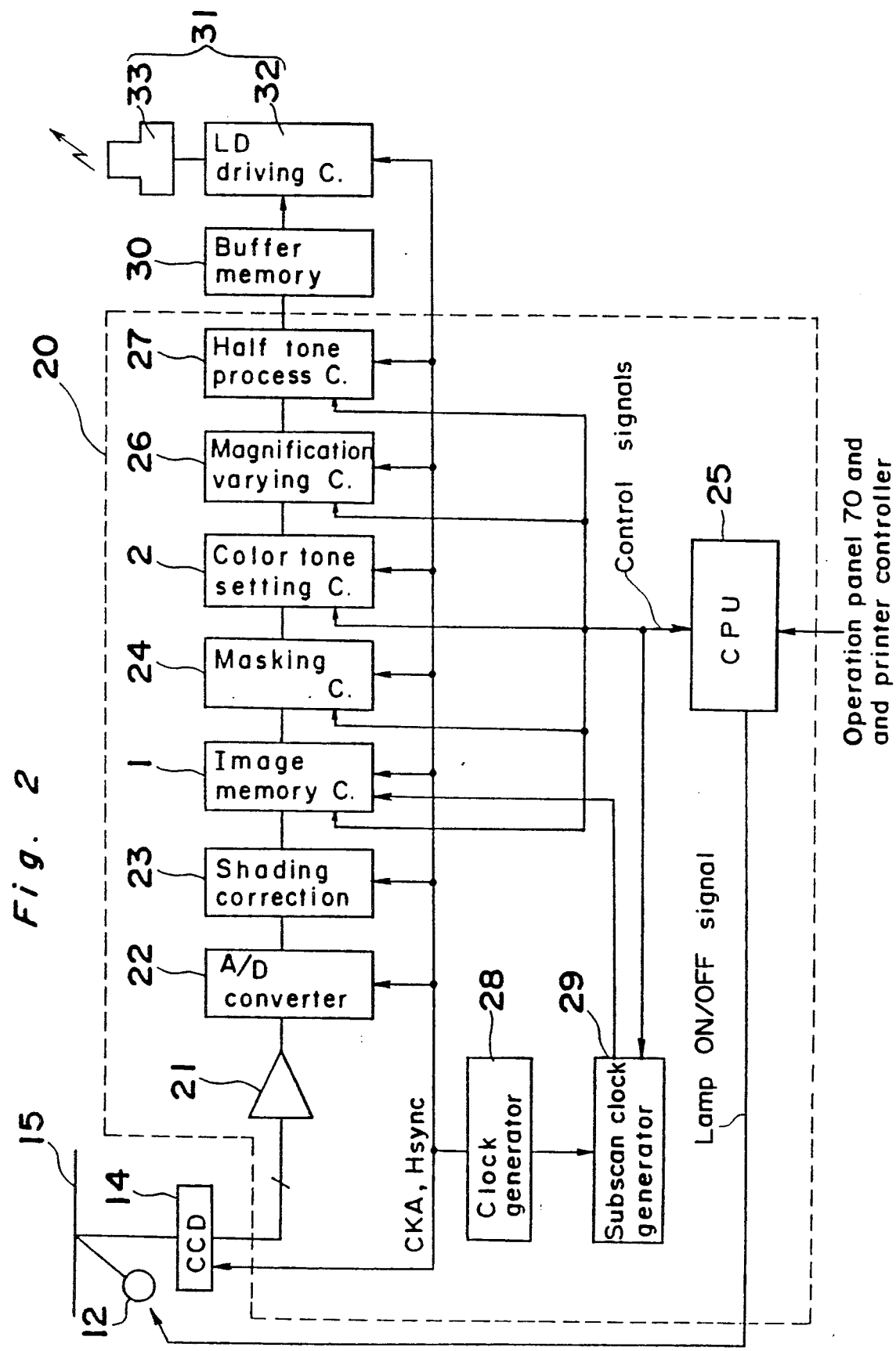

FIG. 2 shows a signal processing portion 20 for processing the analogue electric signals outputted from the CCD color image sensor 14 and generating the binary image forming signals corresponding to the analogue electric signals. The signal processing portion 20 has a circuit structure similar to that of the conventional one except that there are provided an image memory unit 1, a color tone setting unit 2 and a variable magnification sub-scan clock generator 29.

In the normal image forming process, the analogue image data signals photo-electrically converted through the CCD color image sensor 14, i.e. the output electric image data signals of the CCD color image sensor 14, are converted into electric signals corresponding to the density of the image through a logarithmic amplifier 21. Subsequently, the analogue electric signals of the image density outputted from the amplifier 21 are converted into multi-valued digital data signals through an analogue-to-digital (A/D hereinafter) converter 22. The shading correction of the multi-valued image data signals of the three colors of R, G and B is carried out through a shading correction unit 23. In a seal mode and mosaic monitor mode as described later, the shading-corrected image data signals outputted from the shading correction unit 23 are stored in the image memory unit 1. The process of the shading correction mentioned above is carried out in parallel with respect to the three colors R, G and B. On the other hand, in a normal color image forming process, the process in the image memory unit 1 is omitted and the image data signals outputted from the shading correction unit 23 are directly transmitted to a masking unit 24.

Thereafter, the masking unit 24 generates image data of one printing color of yellow, magenta, cyan and black colors from the image data of three colors R, G and B according to the characteristics of the designated image forming toner, wherein the printing color is determined in response to a control signal sent from a CPU (central processing unit) 25.

The masking unit 24 comprises an underground color removing unit for removing a color data on an underground surface of the image to be processed and a black color data generating unit for generating a suitable black color data at the time of scanning an image of black color. When the color adjustment is to be altered in the mosaic monitor mode or a normal mode, the color tone setting unit 2 performs the color correction of the image data outputted from the masking unit 24 and the color-corrected image data outputted from the color tone setting unit 2 is transmitted to a variable magnification unit 26. On the other hand, in the case that the color adjustment is not altered in the normal mode or in the seal mode, a standard color adjustment is performed by the color tone setting unit 2 without performing the color correction. The variable magnification unit 26 is provided for electrically processing the output signals of the masking processing unit 24 or the color tone setting unit 2 so as to electrically control the variable magnification of the image in the main scan direction by a known manner (the explanation thereof is omitted), and the output image data of the variable magnification unit 26 is transmitted to a half tone processing unit 27. On the other hand, the magnification in the sub-scan direction can be varied by varying the velocity of the relative movement between the original and the scanner 10.

The half tone processing unit 27 binarizes the image data outputted from the variable magnification unit 26 and generates binary pseudo half tone signals which are stored in a buffer memory 30. The LD drive unit 32 drives the semiconductor laser 33 for generating a laser beam in response to the pseudo half tone signals transmitted from the buffer memory unit 30. A clock generator 28 generates a horizontal synchronizing signal Hsync and a clock signal CKA for synchronizing the reading action of the CCD color image sensor 14 with the image data processing of the respective units in the signal processing portion 20. Moreover, a variable magnification sub-scan clock generating unit 29 generates a sub-scan clock signal for varying the magnification which is transmitted as an interruption signal to the image memory unit 1 in response to the control signal transmitted from the CPU 25. When the image data is processed with equal magnification, the timing of the variable magnification sub-scan clock signal is equal to that of the horizontal synchronizing signal Hsync.

Although the constitution of the CPU and the peripheral input and output units for controlling such as an electro-photographic process and operation panel 70 is not shown in FIG. 2, it will be described later with reference to FIG. 6.

Figure 3:
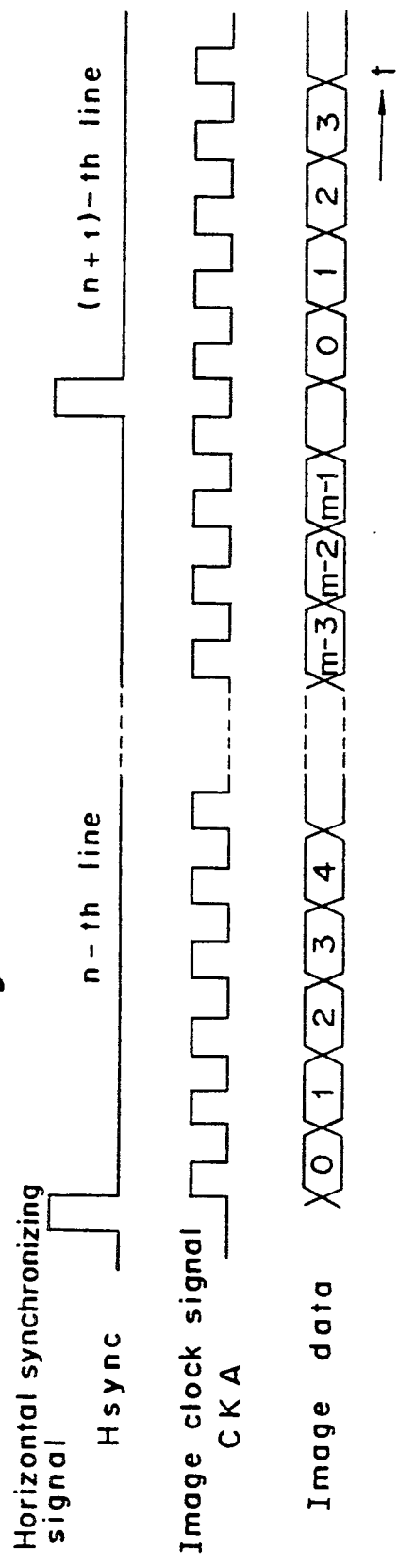

FIG. 3 shows a timing chart of the processing of the image data which is processed in the signal processing portion 20. As shown in FIG. 3, the horizontal synchronizing signal Hsync and the clock signal CKA are generated by the clock generator 28, and the image data of the three colors R, G and B transmitted from the CCD color image sensor 14 are serially synchronized with the clock signal CKA generated by the clock generator 28, wherein the numerals indicated in the individual image data denote the addresses in the main scan direction. And the line n in the main scan direction is renewed every time the horizontal synchronizing signal Hsync is generated by the clock generator 28. In other words, the scanner 10 is advanced by a unit distance in the sub-scan direction.

The digital color copying machine of this embodiment has a seal printing function performed in a seal print mode and a color adjustment function performed in a mosaic monitor mode. In order to perform the above functions, a memory means is required for storing image data corresponding to a part of the area on the original. Since there are many commons in the image data processing, the image memory unit 1 for storing and reading out the image data is commonly used as the color tone setting unit 2 for adjusting the color tone so that the functions thereof can be accomplished by the control signals from the CPU 25. Although, in the seal print function, the binary image data processed through the half tone processing unit 27 may be stored in the memory unit, since it is so constituted that the multi-valued image data can be stored in the memory unit, the color adjustment can be performed when in the color copying operation. In connection with the mosaic monitor mode, since it is disclosed in the U. S. Ser. No. 321,405 applied by the present applicant, so the detailed description thereof is omitted herein.

Figure 4:
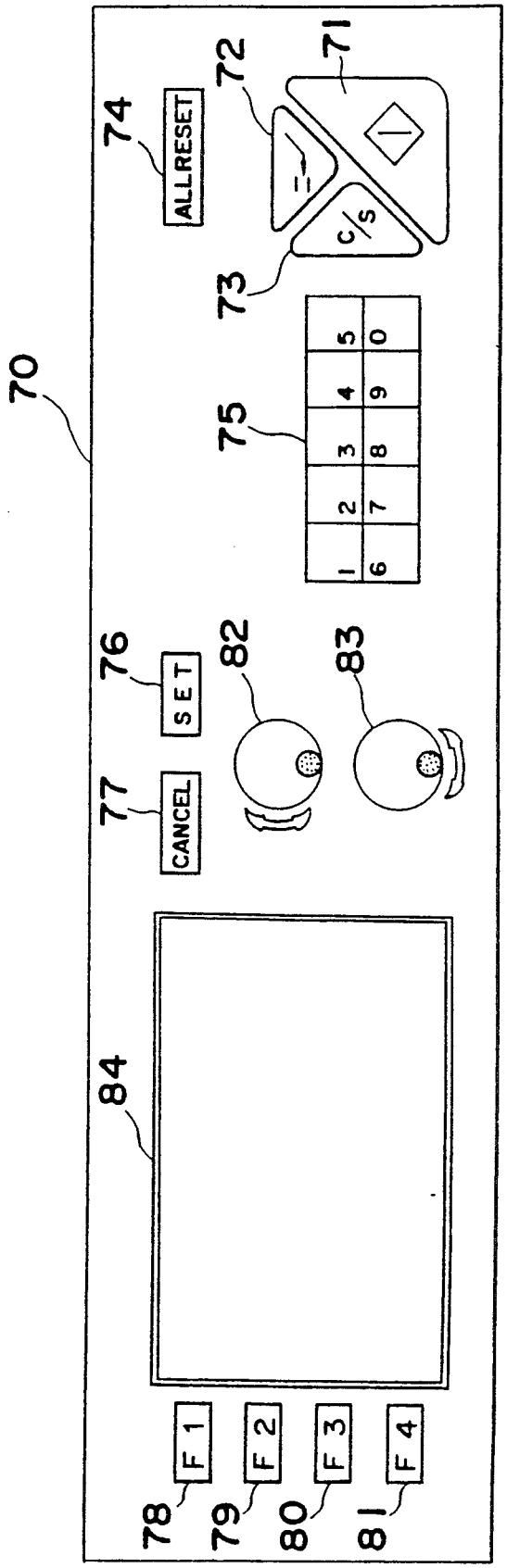

FIG. 4 shows an arrangement of various keys provided on the operation panel 70 which is located on the upper portion of the copying machine. On the operation panel 70, there are provided a print start key 71 for starting a copying operation, an interruption key 72 for instructing an interruption copying operation, a clear stop key 73, an all reset key 74, a set of numeral ten keys 75, a set key 76, a cancel key 77, and various function keys 78 to 81, wherein the function keys 80 and 81 are respectively memory image output key and image storing key. And there are also provided jog dials 82 and 83 for setting the areas of an original which are described later and a display portion 84 composed of such as liquid crystal for displaying the original image to set the above areas and displaying various message data.

As shown in FIG. 6, the CPU 25 controls not only the image processing portion 20 but also the operation panel 70 and the printing operation. The CPU 25 is connected to a read only memory (referred to as ROM hereinafter) 91, random access memory (referred to as RAM hereinafter) 92 used as a working area, magnification data memory (RAM) 93, one-block size memory (RAM) 94, sheet size memory (RAM) 95, picture number memory (RAM) 99 and connected to an operation panel input/output (I/O) interface 96. The operation panel input/output (I/O) interface 96 is connected to the various keys 71 to 83 provided in the operation panel 70 and connected to the display unit 84.

The CPU 25 is connected to a timer T, a sheet sensor 54, a toner sensor 55, an A/D converter 57, and a driver unit 58 through an input/output (I/O) interface 98. Furthermore a thermal sensor 56 is connected to the input/output interface 98 through the A/D converter 57, and a motor 59 is driven by a control of the CPU 25 through the driver unit 58. Herein, the sheet sensor 54 is provided in a sheet feeding portion for detecting the size of the sheet disposed in a cassette attached to the copying machine. The toner sensor 55 is provided for detecting the remainder of the toner in the respective developing containers. The thermal sensor 56 is provided for detecting the temperature of a fixing device 48.

(b) SEAL MODE

Figure 7:
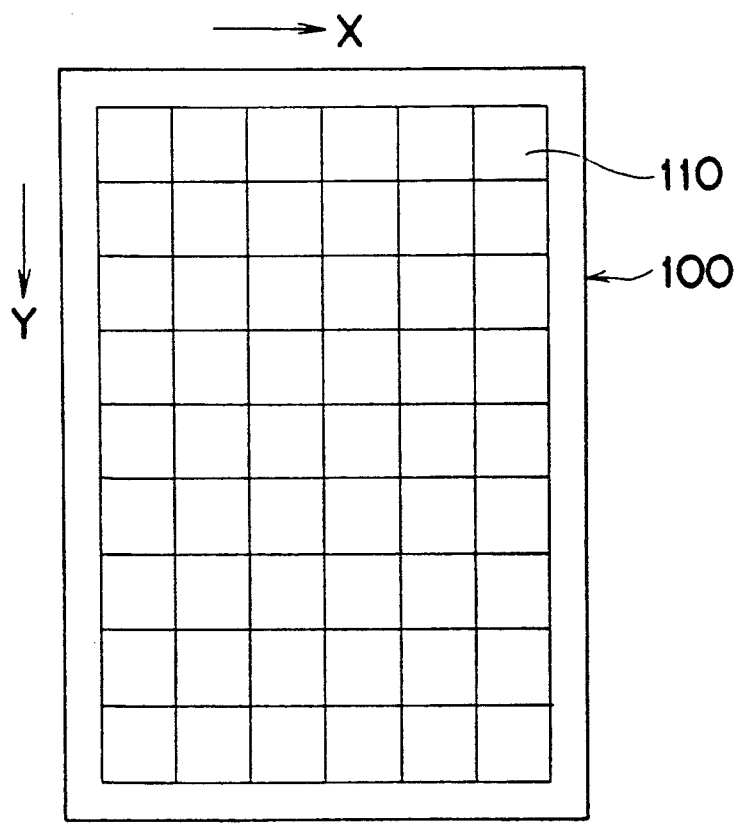

In the seal mode, a user designates an attention area for use as a seal in the entire area of an original, and the image of the attention area designated by the user is formed to be printed on a plurality of block regions of a sheet in one printing process. In one example as shown in FIG. 7, a plurality of the same images 110 (of 54 pieces in six rows in the longitudinal Y direction and in nine lines in the lateral X direction) are printed on a copying sheet 100. Each of the printed images 110 is cut off to obtain seals of 54 pieces.

Figure 8:
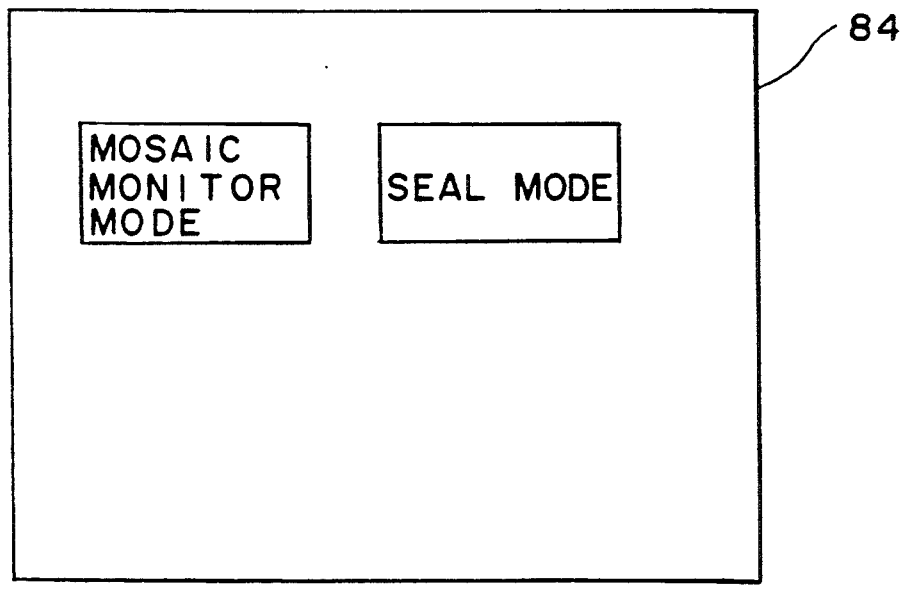

When the seal mode is to be selected, as shown in FIG. 8, under the condition that the two mode names are being displayed on the display portion 84, the user shifts the cursor to a position of a desired mode by operating the jog dials 82 and 83 and pushes the set key 76, thereby setting the desired mode. In this example, the cursor is shifted to the position of "seal mode output" and the set key 76 is pushed so that the seal mode is set (see FIG. 17, step 1').

Figure 5:
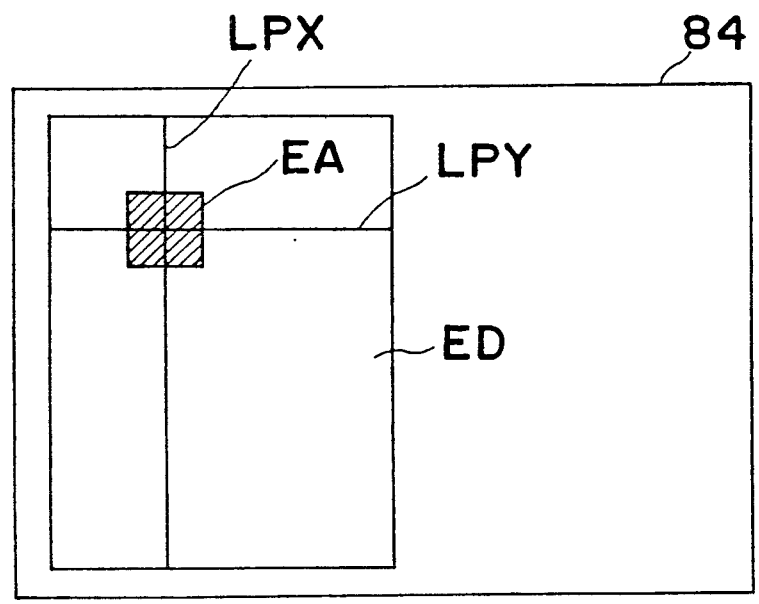
Figure 18:
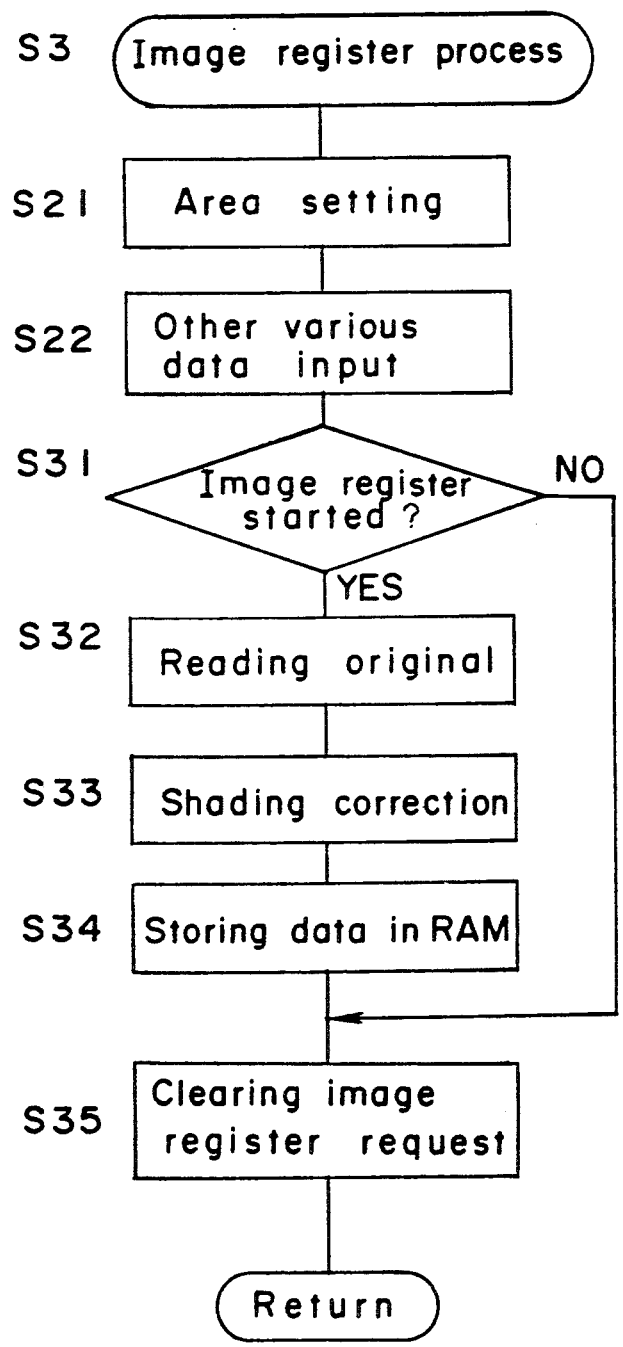

In the seal mode, when the user operates the image register key 81 in the operation panel 70, the image register mode is set (see FIG. 18). In this seal mode, first the original is prescanned and then the user selects a part of the area on the original and sets the selected area as an attention area for use as a seal as shown by an oblique line portion EA in FIG. 5. When the attention area is set, as shown in FIG. 5, the original placed on the platen 15 is prescanned by the scanner 10, whereby the original image is schematically displayed in the original area ED on the display portion 84 in the operation panel 70. The intersecting point of the longitudinal indicating line LPY with the lateral indicating line LPX is positioned at the center point of the attention area EA. By operating the jog dials 82 and 83, the longitudinal and lateral indicating lines LPY and LPX are shifted up and down or right and left, so that the area EA is defined, whereby the attention area is set by operating the set key 76. At this time, the range of the set attention area to be stored in the memory is constant and the coordinates of the vertexes of the attention area are automatically calculated out to be set from the coordinates of the intersecting point of the indicating lines LPY and LPX. In the subsequent scanning operation, only the image data corresponding to the set attention area is stored in the memory of the registered image memory unit 1. (In this example, although the image data is stored at the same magnification rate, the image data may be stored with variable power.) Moreover, the maximum range of the attention area is limited in accordance with the capacity of the memory.

Figure 9:
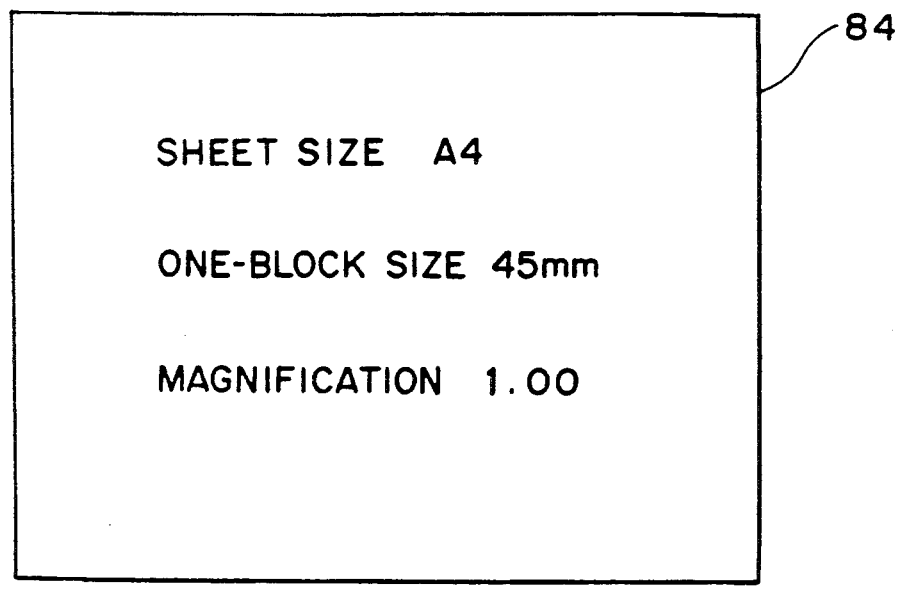

Then, by operating the memory image output key 80 in the operation panel 70, the program goes to the seal mode output process (see FIG. 19). When the program goes to the seal mode output process, a standard printing condition (sheet size, one block size and magnification) is displayed on the display unit 84 as shown in FIG. 9 for example.

In the seal mode output process, the user may change the printing condition if necessary (see FIG. 19 steps S101 to S107). At this time, in the displayed picture as shown in FIG. 9, the cursor is shifted to a position of a printing condition to be changed by operating the jog dials 82 and 83 and then desired values of the printing condition are entered by operating the numeral ten keys 75. By operating the set key 76 every time each printing condition is changed, the changed condition is sequentially stored in the respective memory units, whereby the changing operation of the printing condition is completed.

The magnification can be changed first among the printing conditions. In this example, although the magnification in the primary scanning direction is set equal to that in the sub-scanning direction, there can be employed an anamorphic system which produces different magnifications along lines in different directions in the image plane. When the size of an area of an original image for use as a seal is different from the size of the seal to be obtained, it is preferable to employ a variable power system. When the data of magnification Z is entered in the displayed picture, the entered data is stored in the magnification data memory unit 93. The variable power operation is carried out by a known electric processing method changing the clock read out of the memory.

Next, the user can change the size of a seal or one block size. In this example, one block is a square having its size of $l_x$ in the primary scanning direction and its size of $l_y$ in the sub-scanning direction ($l_x = l_y = l$). When the capacity of the memory in the registered image memory unit 1 is C, the data of the original image corresponding to the area of $\sqrt{C}$ square is stored. Therefore, the size l of one block can be set to 0 to $\sqrt{C}$. In the variable power operation, the size l of one block can be defined in the range of 0 to $Z\sqrt{C}$. In the printing operation, the area of reading out the image data is set in accordance with the designated size of one block. In the displayed picture, various sizes of seals are needed. When the size of one block is entered in a unit of milli-meter, the entered size data is converted to an address number, which is stored in the one block size memory unit 94. Moreover, if it is desired to obtain a rectangular one-block of a seal, the sizes $l_x$ and $l_y$ of the one-block can be easily changed.

In this example, although the size 1 of one-block of a seal can be varied in the printing operation, the size S of the original image on the original can be designated. In this case, the size 1 of one block can be calculated by a calculation (S ×Z).

Moreover, in the variable power operation, when the value l/Z is larger than the size $\sqrt{C}$ of the image stored in the memory of the registered image memory unit 1, the amount of the image data is insufficient to the seal size. In this case, the maximum limit of the amount of the image data can be automatically set in accordance with the size of the memory and also the deficiency of the image data may be displayed as "white" data.

In addition, the user can change the sheet size. When the sheet size is changed, data of a desired sheet size is entered by operating the numeral keys so that the desired sheet size (such as A3 size) is designated. The designated sheet size is stored in the sheet size memory unit 95. The relation between the numerals of the numeric keys and the sizes of the sheet is as follows:

1→A5, 2→A4, 3→A3, 4→B4, 5→B5

When such as a seal size is changed, the format of the output image data is changed, so that there is a fear that the seal image is cut off on the way of printing operation at the end of the sheet. Therefore, the respective printing conditions mentioned above are changed, thereafter the maximum number of the output images to be displayed is so determined depending on the printing conditions of the sheet size and one block size that each of the displayed images is not partially cut off at the end of the sheet.

Figure 10:
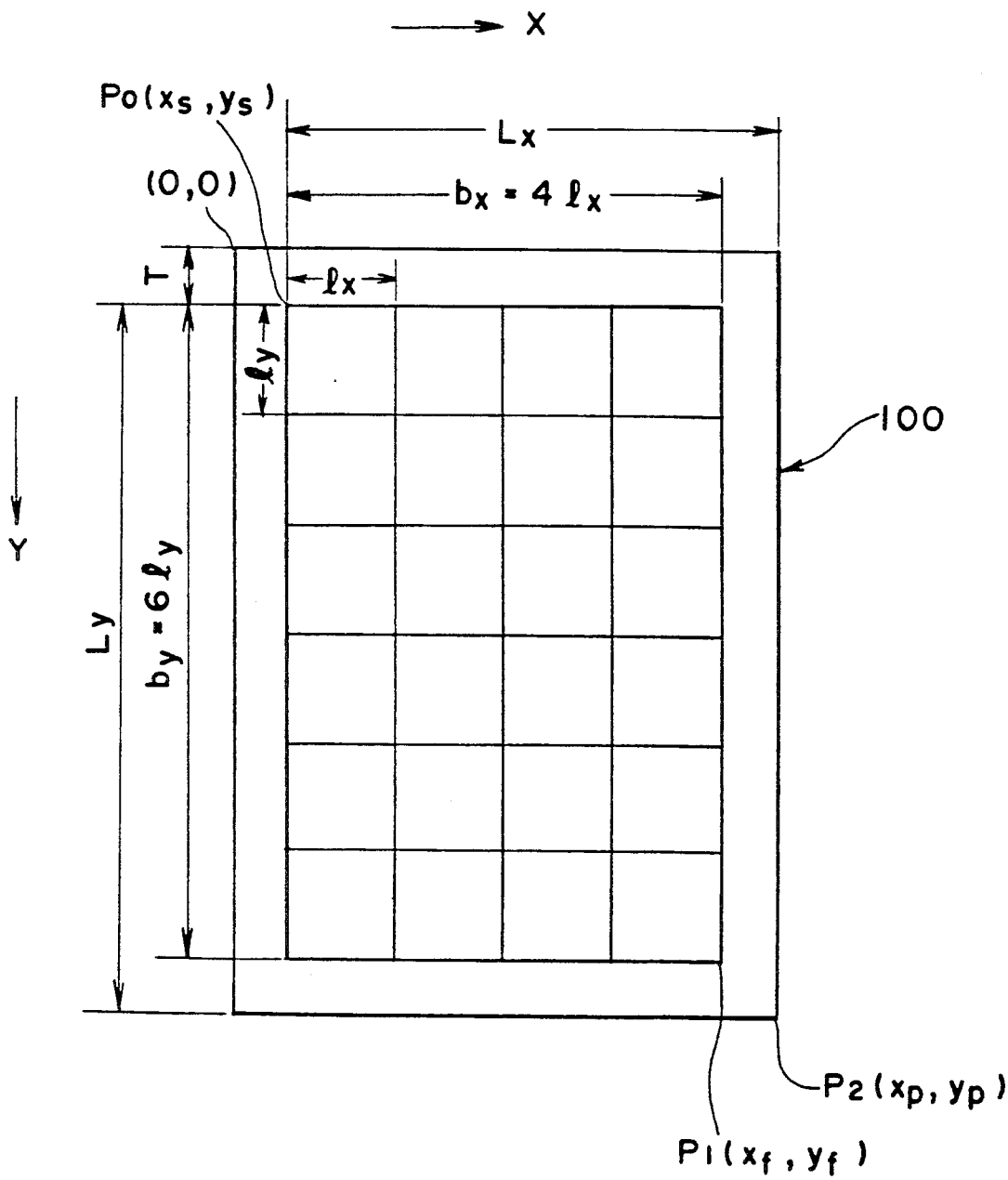

FIG. 10 shows an example of a format of output image data of a seal in a matrix having four rows and six lines. In this example, on a surface of a sheet 100, there is defined a rectangular section having a corner point $P_0(x_s, y_s)$ at its left top corner and another corner point $P_1(x_f, y_f)$ at its right bottom corner, and the rectangular section is divided into a plurality of blocks in a matrix having m rows and n lines, so that the same seal image is printed on each of the blocks. In this example, each block is made square of 1×1.

The number m of the output images in the primary scanning direction (X) and the number n of those in the subscanning direction (Y) are automatically determined as follows (see FIG. 20).

On the sheet 100, the print starting point $P_0(x_s, y_s)$ is predetermined. The user previously designates the size of the printing sheet 100, one block size 1 and variable magnification Z. The coordinates of the point $P_0$ are shown in a unit of image size detected by one picture element of the CCD color sensor 14 for corresponding to an address of a memory 401. Under the previously set conditions, the coordinates $(x_p, y_p)$ of the point $P_2$ at the right bottom corner are determined depending on the sheet size. $L_x$ ($=x_p-x_s$) represents the difference between the size of the sheet and the size of the left space in the primary scanning direction, and $L_y$ ($=y_p-y_s$) represents the difference between the size of the sheet and the size of the upper space in the sub-scanning direction.

Accordingly, the numbers m and n of the output images are calculated as follows:

$$m = INT(L_x/l_x), n = INT(L_y/l_y)$$

herein, INT(a) represents the maximum integer not more than a. The coordinates $(x_f, y_f)$ of the point $P_1$ of the right bottom corner are determined depending on the numbers m and n of the output images obtained as mentioned above, thereby obtaining the reading out area setting signals $(x_s-1)$, $(x_f-1)$, $(y_s-1)$ and $(y_f-1)$ which are transmitted to the registered image memory unit 1 (see FIGS. 12 and 14). Also, there can be obtained one block size signals $(b=l_x/Z)$ and $(b=l_y/Z)$ which are transmitted to the registered image memory unit 1.

Figure 11:
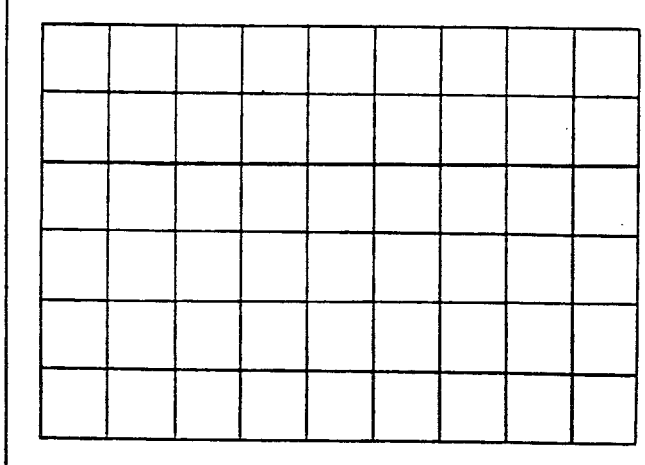
Figure 21:
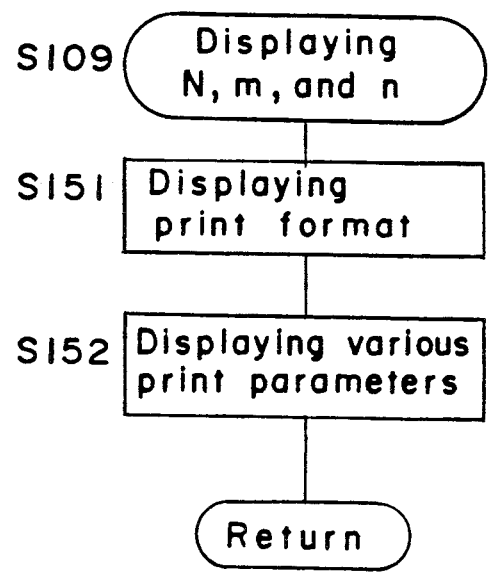

When the initializing conditions (such as sheet size A3, one block size 25 mm and magnification 1.8) are set, as shown in FIG. 11, the respective parameters of the number of the output images are displayed in the right portion and the format of the output data of the seal image is displayed in the left portion of the display screen 84 (see FIG. 21). In this example, the format of the output seal image data is displayed in a matrix of 6×9, and also the number (m×n) of the output images with m rows and n lines are displayed. Therefore, the user can easily judge whether or not the initialized conditions are suitable before printing of the seal images.

Subsequently, when the seal mode output process is designated by operating the print starting key 71 (see FIG. 8), the user can change the printing direction and the number of the output images to be printed if necessary under the condition of displaying the number of the output images on the display screen 84 as shown in FIG. 11 (see steps 120 to 123 in FIG. 19(b)). In the displayed picture as shown in FIG. 11, the cursor is shifted to a position of a desired print condition to be altered by operating the jog dials 82 and 83 and inputting the desired value with ten keys 75, so that the number of the output images can be changed by pushing the set key 76. If the user desires to print out the images only in the longitudinal direction, the number of the output images to be printed in the lateral direction should be set "0". The image data stored in the memory are repeatedly read out in a block unit in the reading out area and the seal images are printed with a predetermined format (see FIG. 19, steps S112 to S114).

Figure 12:
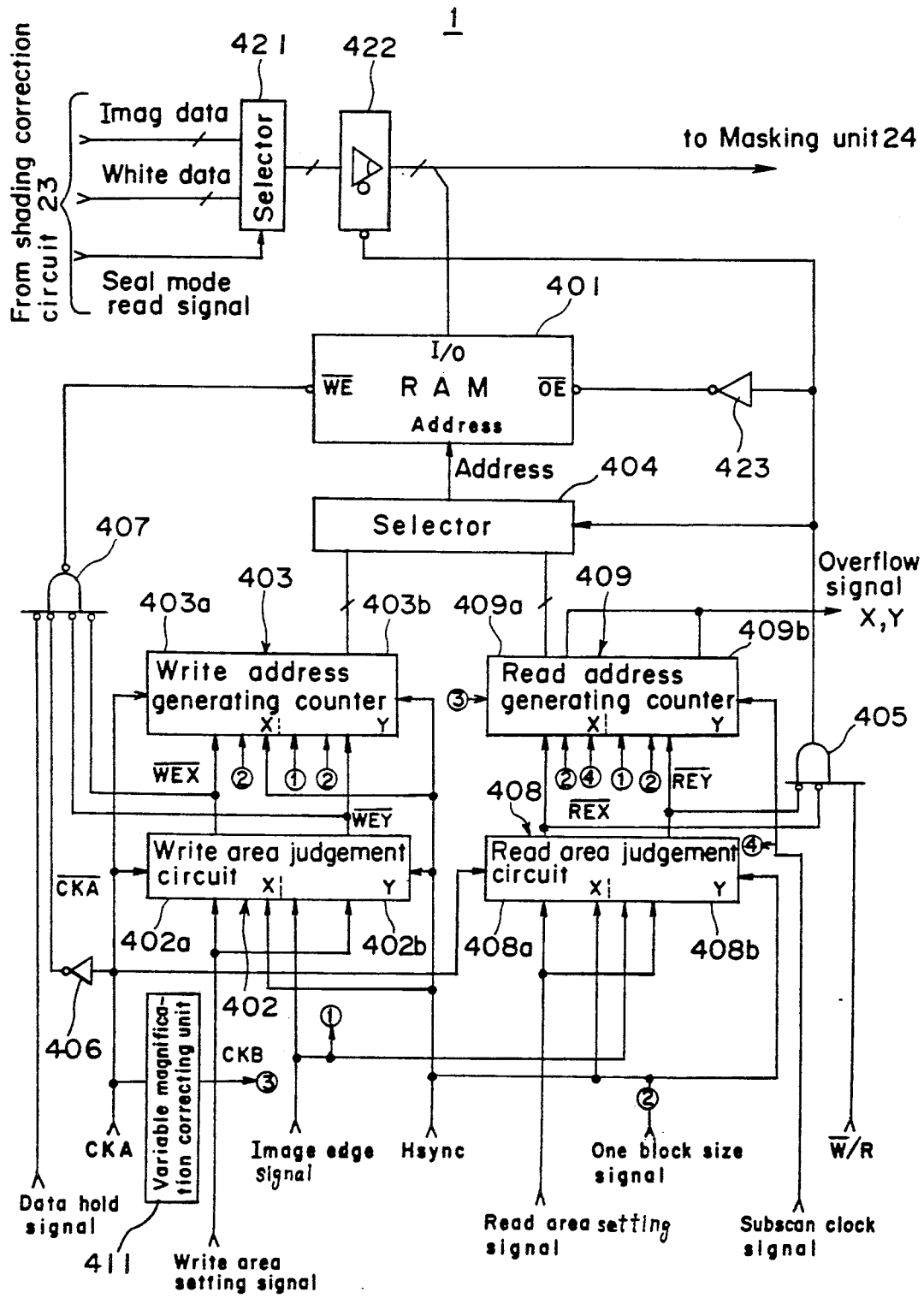

The variable power operation is performed by varying a clock signal for reading out the image data from the memory through clock correcting units 29 and 411 (see FIGS. 2 and 12). The variable power correcting unit 411 receives the input clock signal CKA and outputs a variable power clock signal CKB which is equal to the clock signal CKA when in the equi-magnification mode. Therefore, when the user designates the magnification Z, the clock signal CKB and sub scanning clock signal Hsync for generating address (see FIG. 14) are varied in accordance with the reciprocal of the magnification Z. Moreover, one block size signals X ($=b_x$) and Y ($=b_y$) for generating overflow signals X and Y every one block are varied (see FIGS. 12 and 14). In this example, although the output image data are read out from the point $P_0(x_s,y_s)$ at the left top corner of the attention image in the memory, only the image data stored in the center portion in the area of the memory may be read out by obtaining the head address (i.e., offset amount in FIG. 14) of reading out the data from the memory depending on the memory size, one block size and magnification.

Figure 13C:
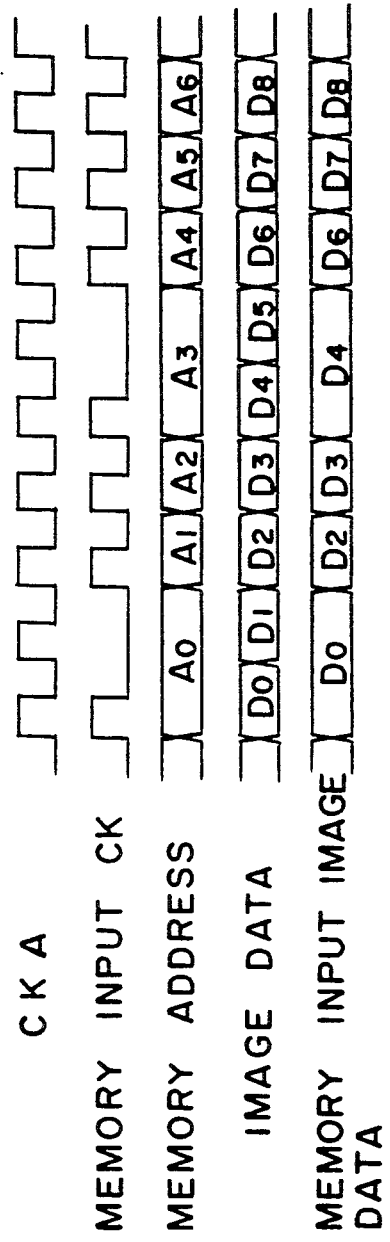
FIG. 13(c) is a timing chart of variable magnification performed by varying clock signal the image data is inputted in the memory.

In addition, the variable power operation can be performed at the time of writing the image data in the memory. In this case, the image data writing clock may be varied through a clock correcting unit similar to that used in the case of reading out the clock signal. FIG. 13(c) shows a timing chart of the variable power operation when the image data is inputted in the memory, wherein the frequency of the clock signal CKA is reduced so as to obtain a memory input clock CK for inputting the image data in the memory. The original image data from the scanner is reduced by the memory input clock CK and the reduced image data is inputted in the memory. Hereby, the image data varied to a designated magnification data can be stored in the memory.

(c) IMAGE MEMORY UNIT

The image memory unit 1 is a circuit arrangement for storing image data of an attention area of an original in a memory 401 and for reading out the registered image data from the memory 401 to be printed onto any specific position on a copying sheet under the condition that the seal mode or mosaic monitor mode is set.

FIG. 12 shows a circuit diagram of the image memory unit 1, wherein the memory 401 is a RAM for storing the image data of an attention area of an original and a selector 421 selects either one of image data between the multi-valued image data and "white" data which are shading-corrected by the shading correction unit 23. When the seal image data or the mosaic monitor image data are read out from the RAM 401 to be printed on a sheet, the "white" data is selected. The output data signal of the selector 421 is transmitted to the I/O port of the RAM 401 or transmitted to the masking unit 24 through a three-state buffer amplifier 422. The state of the three-state buffer amplifier 422 becomes high impedance state only when the registered image data on the reading out area is read out from the RAM 401 (i.e., the terminal $\overline{OE}$='0') in the seal image or mosaic monitor mode. In the other cases, when the seal image or mosaic monitor image is not printed in the seal mode or mosaic monitor mode, the white data is transmitted from the selector 421 to the masking unit 24 through the buffer amplifier 422. While the image data of the attention area is registered in the RAM 401 in the seal mode or mosaic monitor mode, the image data is transmitted from the selector 421 to the RAM 401 through the buffer amplifier 422. In the image forming operation, the registered image data is repeatedly read out from the RAM 401, whereby the seal images or mosaic monitor images are printed on a plurality of blocks in a matrix on the same sheet.

A writing area judging unit 402 is provided for judging on the basis of writing area setting signals in the main scan direction (X) or sub-scan direction (Y) set by the control of the CPU 25 whether or not the image data is within the writing area in the main scan direction X or subscan direction Y. Based on the judgment of the writing area judging unit 402, when the image data is within the writing area, the clock signal $\overline{CKA}$ is selected and transmitted to an input terminal $\overline{WE}$ of the RAM 401 through an AND gate 407, thereby enabling to write the image data in the RAM 401.

In a similar manner, there is provided a reading area judging unit 408 for judging whether or not the image data is within a reading area in the main scan direction and sub-scan direction based on the reading area setting signals in the main scan direction (X) and sub-scan direction (Y) based on the format data outputted from the CPU25. On the basis of the judgment of the reading area judging unit 408, when the image data is within the reading area, a digital data of '1' is transmitted from an AND gate 405 to an inverter 423 so that the output data '0' outputted from the inverter 423 is applied to another terminal $\overline{OE}$ of the RAM 401, thereby enabling the RAM 401 to read out the image data therefrom.

The address signals for writing and reading data in/from the RAM 401 are respectively generated by a writing address generating counter 403 and reading address generating counter 409 so as to be transmitted to the address input port of the RAM 401 through a selector 404. The selector 404 selectively outputs either the writing address or reading address in response to whether the image data is to be written in or read out. The writing address and reading address are both generated as one-dimensional address signals by using a multiplier and an adder based on the addresses and offset amounts in the main scan direction X and sub-scan direction Y.

The operation of the image memory unit 1 is further described in detail as following.

In the registered image writing operation, when an attention area of an original is designated by a user using the jog dials 82 and 83, the ranges of the attention area are calculated by the CPU 25 in what range of the lines with respect to the sub-scan direction Y from the end portion of the image and in what range of the picture elements in the main scan direction X. That is to say, the coordinates $(x_s, y_s)$ of the top left corner of the attention area and the coordinates $(x_f, y_f)$ of the bottom right corner of the attention area are calculated and exactly the coordinates $(x_s-1, y_s-1)$ and $(x_f-1, y_f-1)$ are respectively set in the X portion 402a and Y portion 402b of the writing area judging unit 402 as the writing area setting signals for judging the writing area in the X and Y directions. When the writing area setting signals of the image edge signals are entered in the X portion 402a and Y portion 402b of the writing area judging unit 402, the horizontal synchronizing signal Hsync and clock signal CKA are counted and the counted values thereof are judged whether or not the counted values are within the writing area setting range mentioned above. When the counted value x in the main direction X is in the range of $(x_s \leq x \leq x_f)$, the low level signal e,ovs/WEX/ (='L') outputted from the X portion 402a of the writing area judging unit 402 is transmitted to the X portion 403a of the writing address generating counter 403. When the counted value y in the sub-scan direction Y is in the range of $(y_s \leq y \leq y_f)$, the low level signal $\overline{WEY}$ (='L') outputted from the Y portion 402b of the writing area judging unit 402 is transmitted to to the Y portion 403b of the writing address generating counter 403. When the writing area judging unit 402 judges that the counting values x and y are within the writing area, the writing address signal is generated by the writing address generating counter 403 so as to be transmitted to the address input port of the RAM 401 through the selector 404. That is to say, when the output signal $\overline{WEX}$ of low level (='L') of the writing area judging unit 402 is entered to the X portion 403i a of the writing address generating counter 403, the clock signal CKA is counted by the X portion 403a of the writing address generating counter 403 so as to generate the counting value as the address with respect to the main scan direction, which is cleared by the horizontal synchronizing signal Hsync. When the output signal $\overline{WEY}$ of low level (='L') of the writing area judging unit 402 is entered to the Y portion 403b of the writing address generating counter 403, the horizontal synchronizing signal Hsync is counted by the Y portion 403b of the writing address generating counter 403 so as to generate the counting value as the address with respect to the sub-scan direction, which is cleared by the image edge signal generated by the CPU 25. The writing address generating counter 403 comprises a multiplier (not shown) and an adder (not shown), whereby both of the addresses and offset amounts in the main scan direction X and the sub-scan direction Y are calculated so that one-dimensional address can be obtained therefrom.

Moreover, when the image data is stored in the RAM 401 by generating the address signals from the writing address generating counter 403, the data holding signal which is applied to the gate 407 is set to low level and the $\overline{\text{writing/reading}}$ signal $\overline{W}/R$ which is applied to the gate 405 is set to low level 'L'. Hereby the selector 404 receives a selecting signal through the AND gate 405 and selectively outputs the address signals transmitted from the writing address generating counter 403 and the selected address signals are transmitted from the selector 404 to the address input port of the RAM 401. The clock signal $\overline{CKA}$ is transmitted to the write enable terminal $\overline{WE}$ of the RAM 401 through an inverter 406 and through the AND gate 407, thereby enabling to store the image data in the RAM 401. In addition, since the level of the writing/reading signal $\overline{W}/R$ is set low 'L', the low level signal $\overline{W}/R$ is entered to the disable terminal of the buffer amplifier 422 through the AND gate 405. Therefore, only when the original image data can be stored in the RAM 401, i.e., under the condition that the low level signals $\overline{REX}$ and $\overline{REY}$ are outputted from the reading area judgment unit 408 to the AND gate 405, the three-state buffer amplifier 422 is enabled and the image data inputted through the selector 421 is transmitted from the buffer amplifier 422 to the I/O port of the RAM 401.

Hereby, only the image data whose area is judged by the writing area judging unit 402 to be in the predetermined range of the writing area both in the main scan and sub-scan directions can be stored in the RAM 401. When the storage of the image data in the RAM 401 is completed, the level of the data holding signal is set to high ('H') which is transmitted from the CPU 25 to the write enable terminal WE of the RAM 401 through the AND gate 407 so that the storage of the image data in the RAM 401 is inhibited so as to hold the registered image data in the RAM 401.

When the image data stored in the RAM 401 is read out, the data must be so read out as to be printed on a specified reading area on the copying sheet. The structure of the circuit arrangement for reading out the image data from the RAM 401 is generally similar to that of the circuit arrangement for storing the image data. In the X portion 408a and Y portion 408b of the reading area judging unit 408 for judging the reading area for the specified area of the sheet, predetermined values are so preset by the CPU 25 to judge that the reading area of the image data is within the predetermined range in the case of $x_s \leq x \leq x_f$ and $y_s \leq y \leq y_f$, wherein $(x_s, y_s)$ is the coordinates of the top left corner $P_0$ of the reading area in the X and Y directions, and $(x_f, y_f)$ is the coordinates of the bottom right corner $P_1$ of the reading area in the X and Y directions (see FIG. 10). In the scanning operation, the image edge signal is entered in the reading area judging unit 408, the values of the horizontal synchronizing signal Hsync and clock signal CKA are counted and it is judged whether or not the counted values of the both signals Hsync and CKA are within the reading area setting range mentioned above. When the counting value in the main scan direction X is in the range of the specified reading area $(x_s \leq x \leq x_f)$, the signal $\overline{REX}$ of low ('L') level is outputted from the X portion 408a of the reading area judging unit 408 so as to be transmitted to the X portion 409a of the reading address generating counter 409. When the counting value in the sub-scan direction Y is in the range of the specified reading area $(y_s \leq y \leq y_f)$, the signal $\overline{REY}$ of low ('L') level is outputted from the Y portion 408b of the reading area judging unit 408 so as to be transmitted to the Y portion 409b of the reading address generating counter 409.

When the reading area judging unit 408 judges that the reading area of the image data is within the predetermined range of the specified reading area, the reading address generating counter 409 generates the reading address signals.

When the level of the signal $\overline{REX}$ is low ('L'), the clock signal CKA (or CKB transmitted from the variable magnification correcting unit 411 in the variable magnification operation) is counted by the X portion 409a of the reading address generating counter 409 so as to generate the address with respect to the main scan direction X, which is cleared by the horizontal synchronizing signal Hsync (or sub-scan clock signal in the variable magnification operation). When the level of the signal $\overline{REY}$ is low ('L'), the sub-scan clock signal sent from the variable magnification sub-scan clock generating unit 29 is counted by the Y portion 409b of the reading address generating counter 409 so as to generate the address with respect to the sub-scan direction Y, which is cleared by the image edge signal generated by the CPU 25. The address and the offset amount in the main scan direction and sub-scan direction are calculated and the calculated products are generated as the one-dimensional address. Since the level of the $\overline{\text{writing/}}$ reading signal $\overline{W}/R$ is high (H) in the reading operation, the generated address signals are transmitted to the address input port of the RAM 401 through the selector 404.

The image data read out of the RAM 401 by accessing the RAM 401 is transmitted to the subsequent masking process. At this time, although the reading address counter 409 is required to count the values and generate the address in the range of the reading area even though the reading area is beyond one block size of the address, however in this case, the X and Y portions 409a and 409b of the reading address counter 409 generate overflow signals X and Y every one block size to the color tone setting unit 2 arranged in the subsequent process and then the X and Y portions 409a and 409b start counting operation from the initialized values again. The overflow signals X and Y are used when the image is printed in the mosaic monitor mode with its color tones made different in each of a plurality of blocks on the copying sheet.

Now, when the images of m x n blocks are desired to be read out, the reading out operation of the image data from the RAM 401 is carried out in such a manner that, the image data of the same line in the main scan direction is read out m times, and thereafter, the image data is read out in the sub-scan direction over the whole area, and then the image data is read out from the top line in the main scan direction X again. When the output signal $\overline{REX}$ of the X portion 408a and the output signal $\overline{REY}$ of the Y portion 408b of the reading area judging unit 408 can be read out (the level of the input signal of $\overline{OE}$ is low), the address signals are generated by the reading address generating counter 409 to access the RAM 401, whereby the registered image data is read out from the RAM 401 and transmitted to the subsequent masking unit 24. At this time, when the counting value of the reading address generating counter 409 becomes larger than the one block size $S_x=1$, the reading address generating counter 409 generates an overflow signal X and starts counting from the initialized value again. Then the image data on the same horizontal line are repeatedly read out m times. Similarly, when the reading of the image data is advanced by $S_y=1$ in the sub-scan direction Y, the reading of the image data corresponding to m blocks in the horizontal direction is completed and the overflow signal Y is generated by the Y portion 409b of the reading address generating counter 409. Thus, m pieces of the images are printed on the sheet in the horizontal direction. This process is repeated n times in the sub-scan direction, whereby the same seal images are read out and printed in a plurality of blocks in a matrix of m lines and n rows on the sheet.

In the reading out operation, since the level of the writing/reading signal $\overline{W/R}$ is high ('H'), when it is judged in the read-out area, the output signals $\overline{REX}$ of 'L' level and REY of 'L' of the reading area judging unit 408 are applied to the AND gate 405, so that the $\overline{W/R}$ signal of 'L' level is applied to the $0\overline{E}$ terminal of the RAM 401 through the inverter 423, thereby enabling to read out the image data from the RAM 401. Also, the three-state buffer amplifier 422 is set in a high impedance state by receiving the 'H' level signal $\overline{W/R}$ through the AND gate 405, so that it is prevented to input the image data from the buffer amplifier 422 to the I/O port of the RAM 401.

When a variable magnification operation is performed at a magnification rate of Z, one-block size signals of ($Sx=1x/Z$), ($Sy=1y/Z$) are set in the X and Y portions 409a and 409b of the reading address generating counter 409. With respect to the main scan direction X, the clock signal CKA is varied by 1/Z through the variable magnification correcting unit 411 corresponding to a variable magnification data set by the CPU 25 so as to generate the clock signal CKB which is applied to the X portion 409a of the reading address generating counter 409, thereby enabling to read out the stored image data in the X direction from the RAM 401. Similarly, with respect to the sub-scan direction Y, the horizontal synchronizing signal Hsync is varied by 1/Z through the variable magnification sub-scan clock generating unit 29 corresponding to a variable magnification data set by the CPU 25 so as to generate the sub-scan clock signal which is applied to the Y portion 409b of the reading address generating counter 409, thereby enabling to read out the stored image data in the Y direction from the RAM 401. The control of the variable magnification is carried out by varying the clock counting for reading out the registered image data from the RAM 401 in accordance with the magnification rate. In this example, the magnification rate can be varied in a range of 0.5 to 2.0 times. As the clock signal CKA for reading out the image data from the RAM 401, in the variable magnification correcting unit 411 and variable magnification sub-scan clock generating unit 29, there is generated a reading clock with a frequency which is two times larger than that of the clock required for the operation at the equal (one-time) magnification rate and the reading clock signal is decreased to generate the variable magnification clock signal (see "the electrically variable power circuit" shown in FIG. 2 disclosed in the Japanese Patent Laid Open 61-239774).

FIGS. 13(a) and 13(b) show timing charts of the signals in the reading operation at the variable magnifications of 0.5 and 2.0 times respectively. At the magnification of 0.5 as shown in FIG. 13(a), the reading clock signal is used without decreasing the frequency thereof which is two times larger than that of the print clock signal. Therefore, the number of the print data is decreased half as that of the read out image data. On the other hand, in the case of two times of the magnification as shown in FIG. 13(b), the frequency of the reading clock signal is decreased by half of that of the print clock signal, and the same read out data is printed every two times.

In addition, when the variable magnification data are different between the variable magnification correcting circuits 411 and 29, there can be performed an anamorphic variable magnification. In this case, the setting signals in the X portion 403a and Y portion 403b of the writing address generating counter 403 are different in the one-block sizes each other.

Figure 14:
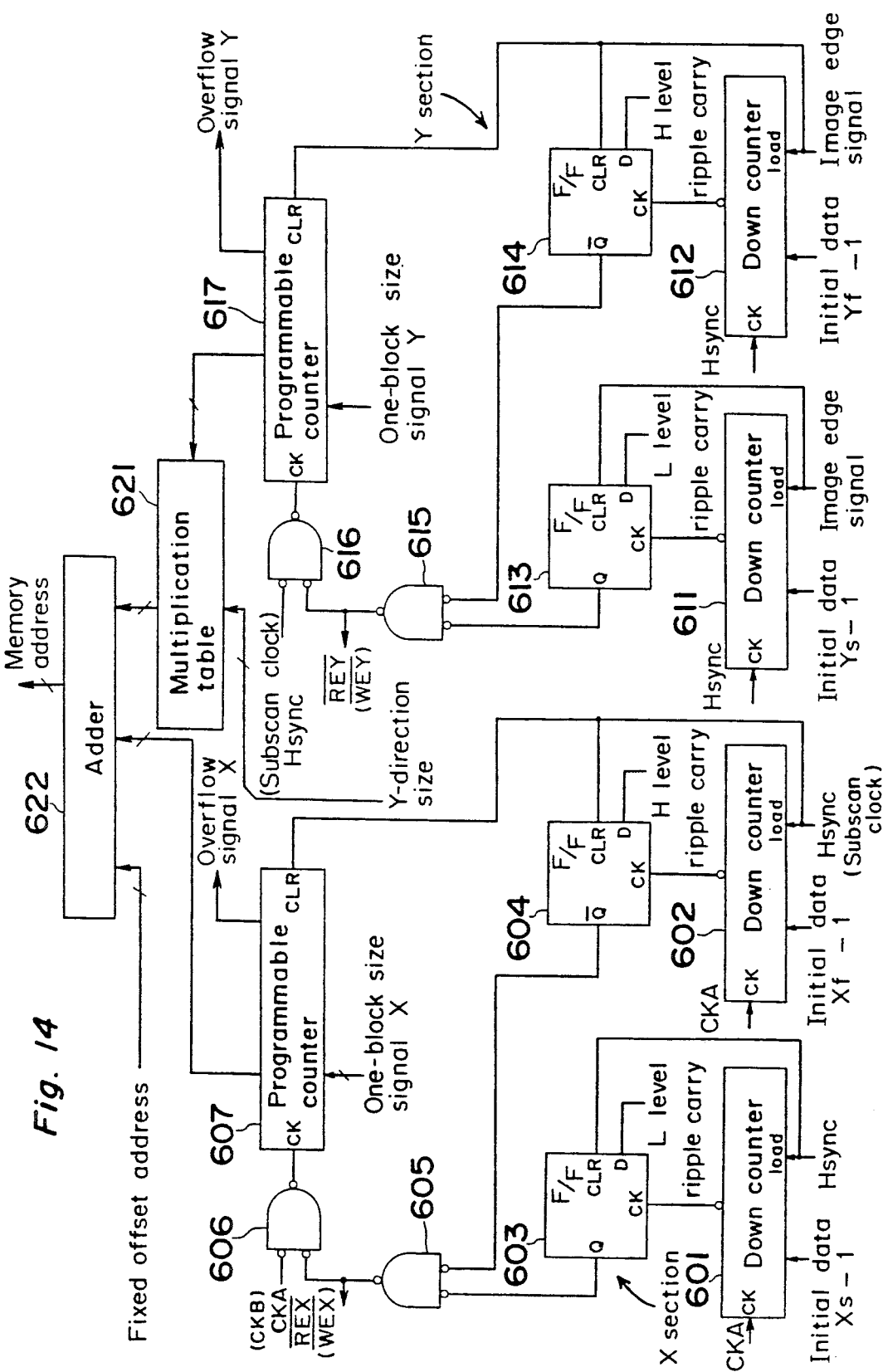

FIG. 14 is a detailed schematic diagram of the read area judgment circuit 408 and the read address generating counter 409 in the image memory circuit 1 shown in Fig. 12. It is to be noted that the write area judgment circuit 402 and the write address generating counter 403 have the same composition as that of the read area judgment circuit 408 and the read address generating counter 409 except for that the overflow signals X and Y are not outputted from the write address generating circuit 403 and the write address generating circuit 403 receives the horizontal synchronizing signal Hsync in place of the variable magnification clock signal. Therefore, only the composition of the read area judgment circuit 408 and the read address generating counter 409 will be described hereinafter.

Referring to FIG. 14, the X portion 408a of the read area judgment circuit 408 is comprised of down counters 601 and 602, a delay type flipflops 603 and 604 and an AND gate 605 Initial data $x_s-1$ and $x_f-1$ for setting the X-gate coordinates of the top left edge $P_0$ and the bottom right edge $P_1$ of the read area outputted from the CPU 25 are input to the preset terminals of the down counters 601 and 602, respectively, and the horizontal synchronizing signal Hsync is input to respective load terminals thereof. Therefore, in response to horizontal synchronizing signal Hsync, the initial data $x_s-1$ and $x_{fn}-1$ are preset in the down counters 601 and 602, respectively. It is to be noted that $x_s$ and $x_f$ are the X-coordinates of the top left edge $P_0$ and the bottom right edge $P_1$ of the square read area, respectively. The clock signal CKA is input to respective clock terminals of the down counters 601 and 602. Therefore, in response to the clock signal CKA, respective counting values of the down counters 601 and 602 are decreased by one, and when respective counting values of the down counters 601 and 602 become zero, in other words, when the clock signal CKA is input as much as the values of $x_s$ and $x_f$, the down counters 601 and 602 generate a ripple carry signal which the is transmitted to respective clock terminals of the delay type flipflops 603 and 604 as the clock signal, respectively.

The horizontal synchronizing signal Hsync is input to respective clear terminals CLR of the delay type flipflops 603 and 604, a Low level signal is input to the D input terminal of the flipflop 603, and a High level signal is input to the D input terminal of the flipflop 604. The Q output of the delay type flipflop 603 becomes a High level at a leading edge of the horizontal synchronizing signal Hsync. After the down counter 601 has counted $x_s$ clock signals, the down counter 601 outputs a High ripple carry signal to the clock terminal of the flipflop 603, and then, the Q output of the flipflop 603 is inverted to a Low level at a leading edge of the ripple carry signal. On the other hand, the $\overline{Q}$ output of the delay type flipflop 604 becomes a Low level at a leading edge of the horizontal synchronizing signal Hsync. After the down counter 602 has counted $x_f$ clock signals, the down counter 602 outputs a High ripple carry signal to the clock terminal of the flipflop 604, and then, the $\overline{Q}$ output of the flipflop 604 becomes a High level at a leading edge of the ripple carry signal. A signal outputted from the Q output terminal of the flipflop 603 and a signal outputted from the $\overline{Q}$ output terminal of the flipflop 604 are input to the inversion input terminals of the AND gate 605, respectively. Therefore, for a time internal between a timing when the down counter 601 has counted $x_s$ clock signals and a timing when the down counter 602 has counted $x_f$ clock signals, the inversion output terminal of the AND gate 605 becomes a Low level.

Figure 15:
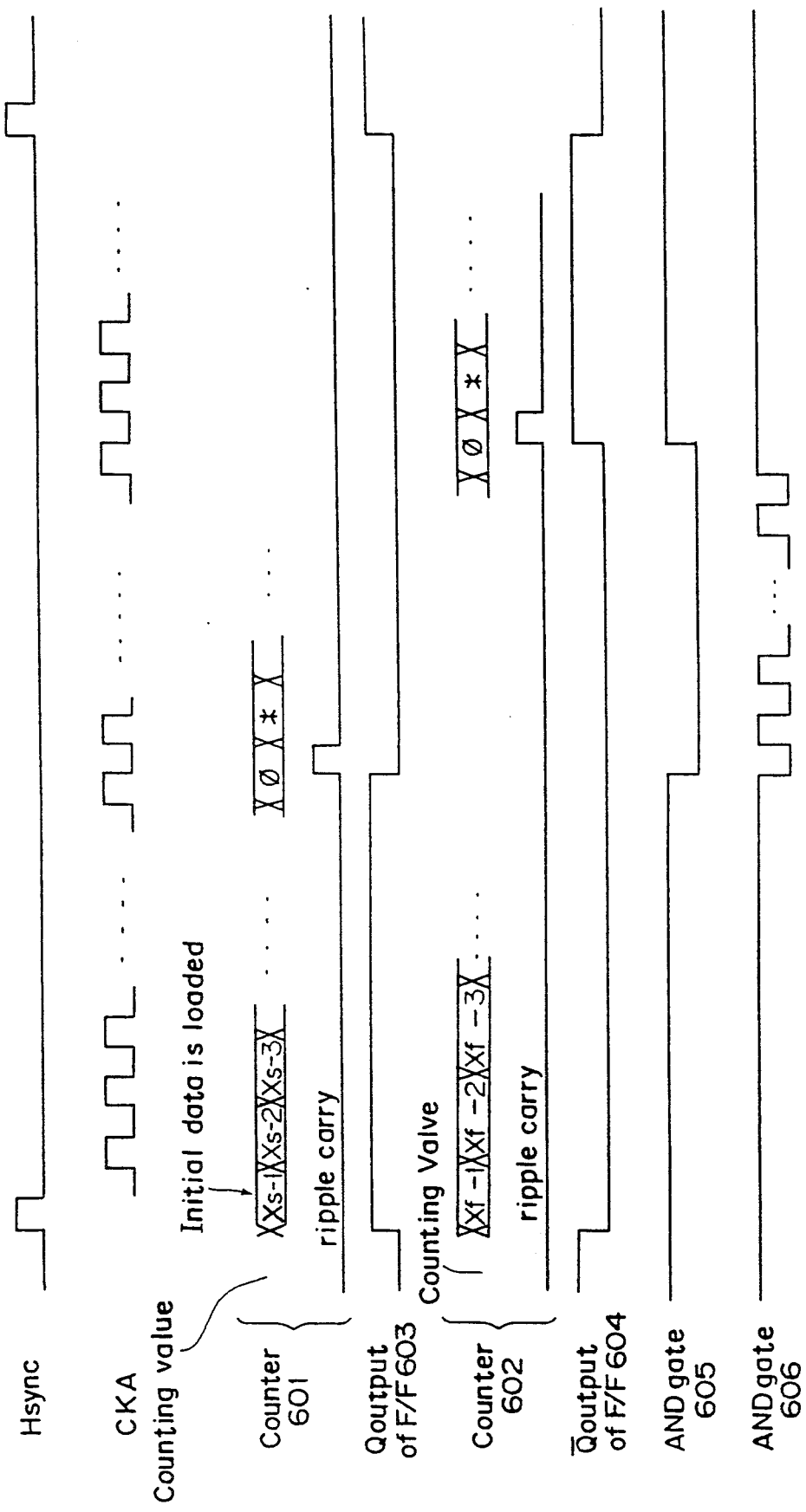

FIG. 15 is a timing chart showing the action of the X portion 408a of the read area judgment circuit 408.

Referring to FIG. 12, after the initial data $(x_s - 1)$ input from the CPU 25 is preset in the down counter 601, the down counter 601 starts counting of the value, and the counting value thereof is decremented every time the clock signal CKA is input thereto. After the down counter 601 has counted $x_s$ clock signals CKA, the down counter 601 generates the High ripple carry signal and outputs it to the clock terminal of the flipflop 603. In response to the High ripple carry signal, the Q output of the flipflop 603 is inverted from a High level to a Low level, and a Low level signal is outputted to the inversion input terminal of the AND gate 605. On the other hand, after the initial data $(x_f - 1)$ input from the CPU 25 is preset in the down counter 602, the down counter 602 starts the count of the value, and the counting value thereof is decremented every time the clock signal CKA is input thereto. After the down counter 602 has counted $x_f$ clock signals CKA, the down counter 602 generates the High ripple carry signal and outputs it to the clock terminal of the flipflop 604. In response to the High ripple carry signal, the $\overline{Q}$ output of the flipflop 604 is inverted from a Low level to a High level, and the High level signal is outputted to the inversion input terminal of the AND gate 605. It is to be noted that, when the flipflops 603 and 604 are cleared, the Q output of the flipflop 603 becomes a High level and the $\overline{Q}$ output of the flipflop 604 becomes a Low level. If $x_s < x_f$, for a time interval between a timing when the down counter 601 has counted $x_s$ clock signals CKA and a timing when the down counter 602 has counted $x_f$ clock signals CKA, the inversion output terminal of the AND gate 605 becomes a Low level.

The X portion 409a of the read address generating counter 409 is comprised of an AND gate 606 and a programmable counter 607. The clock signal CKA (CKB) and the signal $\overline{REX}$ are input to respective inversion input terminals of the AND gate 606, and a signal outputted from the inversion output terminal of the AND gate 606 is input to the clock terminal of the programmable counter 607. Therefore, when the signal $\overline{REX}$ outputted from the AND gate 605 becomes a Low level, the AND gate 606 outputs the clock signal CKA (CKB) to the clock terminal of the programmable counter 607. The one-block size data ; outputted from the CPU 25 is input to the programmable counter 607 as a divisor and the programmable counter 607 counts the clock signal CKA (CKB) cyclically.

In the case that the length in the main scan direction of the registered image corresponds to the one-block size signal 1 of the clock CKA (CKB), when the image data is stored in the RAM 401, the data $x_s$ and $x_f$ outputted from the CPU 25 are set so as to have the following relation:

$$x_f - x_s = 1$$

Furthermore, when m block-shaped images are printed on a copying sheet in the main scan direction X in the mosaic monitor mode, since the variable magnification clock CKB is used, the data $x_s$ and $x_f$ outputted from the CPU 25 are set so as to have the following relation:

$$(x_f - x_s)/m = 1/Z$$

The Y portion 408b of the read area judgment circuit 408 is comprised of down counters 611 and 612, delay type flipflops 613 and 614 and an AND gate 615. The Y portion 409b of the read address generating counter 409 is comprised of an AND gate 616 and a programmable counter 617. The composition and operation of the Y portion 408b of the read area judgment circuit 408 and the Y portion 409b of the read address generating counter 409 are similar to those of the X portion 408a of the read area judgment circuit 408 and the X portion 409a of the read address generating counter 409 except the following matters (1) to (4):

(1) The initial data $(y_s - 1)$ and $(y_f - 1)$ outputted from the CPU 25 are preset in the down counters 611 and 612, respectively.

(2) The subscan clock signal such as Hsync or variable magnification clock is input to the inversion input terminal of the AND gate 616 in place of the clock signal CKB.

(3) The image edge signal or sub-scan clock is input to respective load terminals of the down counters 611 and 612, respective clear terminals of the flipflops 613 and 614 and the clear terminal of the programmable counter 617 in place of the horizontal synchronizing signal Hsync.

(4) The one-block size data 1/Z are preset in the programmable counter 617.

Furthermore, the programmable counters 607 and 617 generate the overflow signals X and Y, respectively.

In the present preferred embodiment, in order to increase the efficiency upon using the memory, there is provided an address converting circuit employing a multiplier table 621 and an adder 622 for converting the address in the main scan direction X and an address in the subscan direction Y into the address of one dimension to be outputted to the RAM 401. By using the address converted by the address converting circuit, the image data can be stored in and read out from the RAM 401 if the quantity of the image data of the specific area to be registered is equal to or smaller than the memory capacity of the RAM 401 even in the case of any length of the block size of the specific area. In the read address generating counter 409, the multiplier table 621 coverts the the size of the read area and the data outputted from the programmable counter 607 into a product address which is the product of them, and the adder 622 adds the fixed offset address calculated by the CPU 25 indicating to the top address of the memory, the data outputted from the programmable counter 607 and the product address outputted from the multiplier 621. The adder 622 outputs the data which is the sum of them to the RAM 401 as a real address. Thus, even though the size of the read area data is in any form, the image data can be stored in the RAM 401 under the condition of a minimarized efficiency upon using the memory.

As described above, the composition of the write area judgment circuit 402 and the write address generating counter 403 is similar to that of the read area judgment circuit 408 and the read address generating counter 409 except for that the clock signal is not input to the write address generating counter 403. In order to make the description thereof short, there are separately provided a write address circuit comprised of the circuit 402 and the counter 403, and a read address circuit comprised of the circuit 408 and the counter 409. Either a write address outputted from the write address generating counter 403 and a read address outputted from the read address generating counter 409 is selected by the selector 404. However, since the write operation of the image data and the read operation of the image data are not performed at the same time, there may be provided one common circuit.

(d) COLOR TONE SETTING UNIT

The color tone setting unit 2 is arranged at a step subsequent to the masking unit 24 for performing the color correction (color adjustment) in the mosaic monitor mode. Since the color correction is not performed in the seal mode, a standard color balance is set in the seal mode.

The masking unit 24 converts respective image data of red color (R), green color (G) and blue color (B) into image data Y, M, C and K for printing which correspond to respective printing colors of yellow color, magenta color, cyan color and black color, and outputs the converted image data to the color tone setting unit 2.

The well known conversion equation for converting the original image data R, G and B into the printing image data Y, M and C is expressed as follows:

$$\begin{pmatrix} Y \\ M \\ C \end{pmatrix} = \begin{pmatrix} a_{00} a_{01} a_{02} \\ a_{10} a_{11} a_{12} \\ a_{20} a_{21} a_{22} \end{pmatrix} \cdot \begin{pmatrix} B \\ G \\ R \end{pmatrix}$$

Respective conversion coefficients $a_{00}$ to $a_{22}$ are predetermined at proper values according to the theory and the result of the experiment so that the color image reflecting that of the original document can be obtained.

In the color adjustment of the color tone setting circuit 2, the following multiplications are performed for respective image data Y, M and C calculated by the above calculation in order to obtain adjusted printing image data $Y_1$, $M_1$ and $C_1$.

$$Y_1 = K_y \times Y.$$

$$M_1 = K_m \times M.$$

$$C_1 = K_c \times C.$$

wherein $K_y$ is the color adjustment coefficient of yellow color, $K_m$ is the color adjustment coefficient of magenta color, and $K_c$ is the color adjustment coefficient of cyan color.

It is to be noted that, the printing image data K of black color is outputted for a picture element only when all the respective image data of yellow color, magenta color and cyan color are outputted. And it is not necessary to make the color adjustment for the printing image data K of black color.

Figure 16:
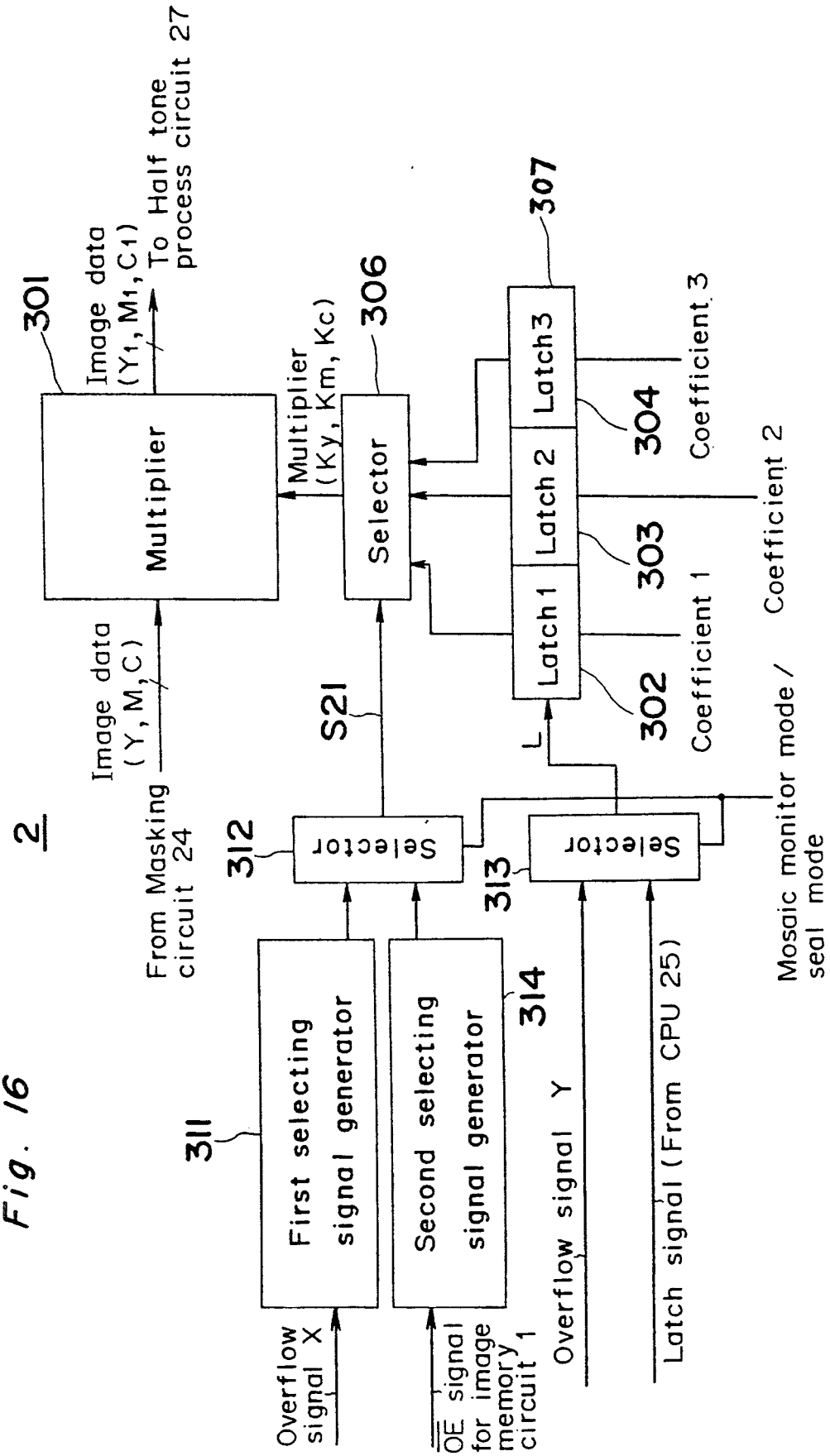

In the color tone setting unit 2 as shown in FIG. 16, a multiplexer 301 calculates the above-mentioned printing image data $Y_1$, $M_1$ and $C_1$ by using the above equations from the image data Y, M and C input from the masking circuit 24, and outputs the printing image data $Y_1$, $M_1$ and $C_1$ to the half tone processing unit 27. In the mosaic monitor mode, different sets of color adjustment coefficients $y_i$, $m_j$ and $c_k$, e.g, (i, j, k) = (1, 2, 3) must be applied to respective blocks of the mosaic monitor images. There is provided a latch circuit 307 comprised of three latches 302 to 304 for respectively latching three coefficients in the main scan direction X in the mosaic monitor mode, which are input from the CPU 25. The three coefficients latched in the latch circuit 307 correspond to the respective three blocks in the main scan direction X.

In the seal mode, however, since the color adjustment is not performed, the standard color adjustment coefficients $y_2$, $m_2$ and $c_2$ are set in one latch 303. When the latch signal is transmitted from the CPU 25, the coefficient 2 outputted from the CPU 25 is latched by the latch 303 through a selector 313. When the $\overline{OE}$ signal is outputted from the memory, the output signal of a second selection signal generator 314 is transmitted to the selector 306 through a selector 312, whereby the output data of the latch 303 is transmitted to the multiplexer 301 through the selector 306. Thus, the same standard color adjustment coefficients $y_2$, $m_2$ or $c_2$ are set in the respective three blocks for the respective printing signals Y, M and C, whereby the adjusted printing signals are outputted.

(e) CONTROL FLOW OF THE COPYING MACHINE

Figure 17:
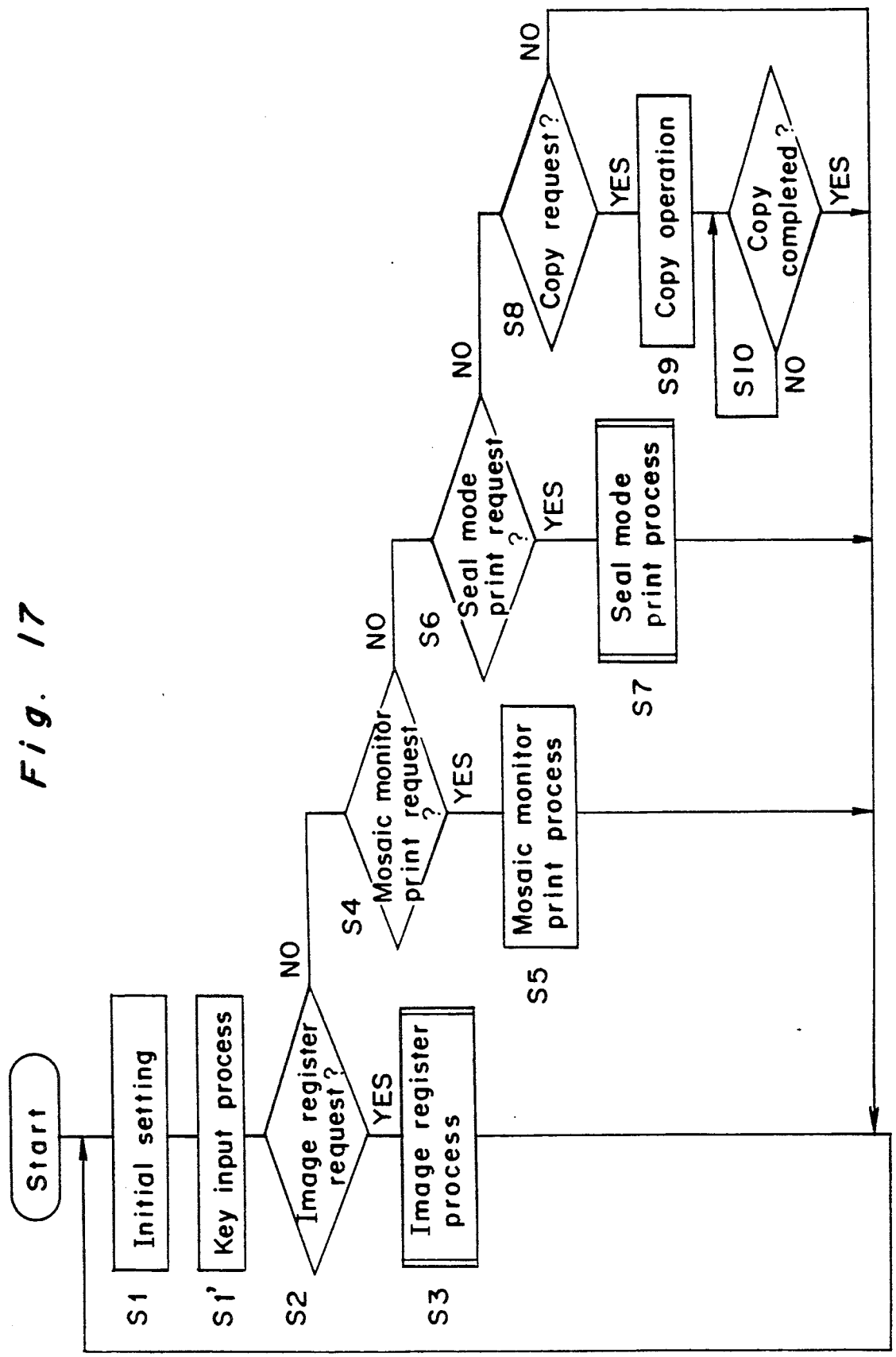

FIG. 17 is a flow chart of a main flow of the control in the mosaic monitor mode and the seal mode performed by the CPU 25 for controlling the digital color copying machine. When the main switch is turned on to supply electric power to the digital color copying machine, the CPU 25 and the peripheral units thereof are initialized.

Referring to FIG. 17, first, the initial setting process is performed in step S1. Namely, as the condition for the copying operation such as the number of prints, the magnification, the size of the copying sheet, an initial condition such as one print, the equal magnification, a mode for automatically selecting the size of the copying sheet is set and a standard density is set as the density, and then, the copying operation can be performed.

Next in step S1', data of the number of prints, magnification and size of copying sheet are inputted by operating the keys. At this time, the content displayed on the display portion 84 is as shown in FIG. 8, and the mosaic monitor mode or seal mode is selected by operating the jog dials 82 and 83 and using the set key 76. Thus, the initial mode is set.

Under the condition that the mosaic monitor mode or the seal mode is set in the step S', when the image register is required by depressing the image register key 81, i.e., in the case of YES in step S2, the image register process is performed in step S3 (see FIG. 18). "The image resister process" means that the image data of the specified area of an original image is stored in the RAM 401 (in step A3).

In the above image register process, an image of an original is read, and the read image is displayed on the display portion 84. Thereafter, a specific area EA is set by using the jog dials 82 and 83 and the set key 76, and the address of the specific area EA is outputted to the write area judgment circuit 402.

If it is required to print the mosaic monitor image on a copying sheet (Yes in step S4), the mosaic monitor image forming process is performed in step S5. In the mosaic monitor printing process, the image data stored in the RAM 401 is read out, and various kinds of color adjustments are made for the read image data, and thereafter, the mosaic monitor image comprised of the images for which the above color adjustments are made is displayed on the display portion 84. Thereafter, the operator selects an image having a desirable color tone from the mosaic monitor image displayed on the display portion 84, and presses the print start key 71 of the operation panel 70 in order to request a copying operation, thereby obtaining an entire image forming with the color balance. In this mosaic monitor mode, since the process thereof is disclosed in the U.S. Pat. Ser. No. 321,405, the explanation thereof is omitted.

When it is required to print seal images in the seal mode (Yes in step S6), the seal mode setting process is performed in step S7. Namely, after checking whether or not the registered image is stored in the RAM 401, the registered image stored therein is read out.

If the image register is not required (No in step S2), it is not required to print the mosaic monitor image on a copying sheet (No in step S4), and it is not required to print the seal image in the seal mode (No in step S6), the standard copying operation is performed in steps S8 to S10. That is, when the copying operation is required in step S8, the standard copying operation is performed in steps S9 and S10.

FIG. 18 is a flow chart of the image register process (step S3 of FIG. 17).

Referring to FIG. 18, when the set key 76 of operation panel 70 is pressed, the area setting values of the specific area set on the display portion 84 are input and set in step S21, and then, the other setting values are input and set in step S22.

Thereafter, it is judged in step S31 whether or not the image register process is started. When the image register process is started (Yes in step S31), the coordinates of the top left edge and the bottom right edge of the stored image area are calculated from the area setting values having been input in step S21, and various data such as data of offset amount, one-block size and magnification data are set in the image memory unit 1, so that the original image of the stored image area is read out in step S32. Thereafter, the shading correction is made for the image data of the read original image in step S33, and the corrected image data is stored in the RAM 401 in step S34. The reading operation of the image data is performed with respective printing colors. Thereafter, it is cleared to request the image resister process in step S35, and then, the program flow returns.

On the other hand, when the image resister process is not started (No in step S31), i.e., when the cancel key 77 is input, it is cleared to request the image resister process in step S35, and then, the program flow returns.

Figure 19A:
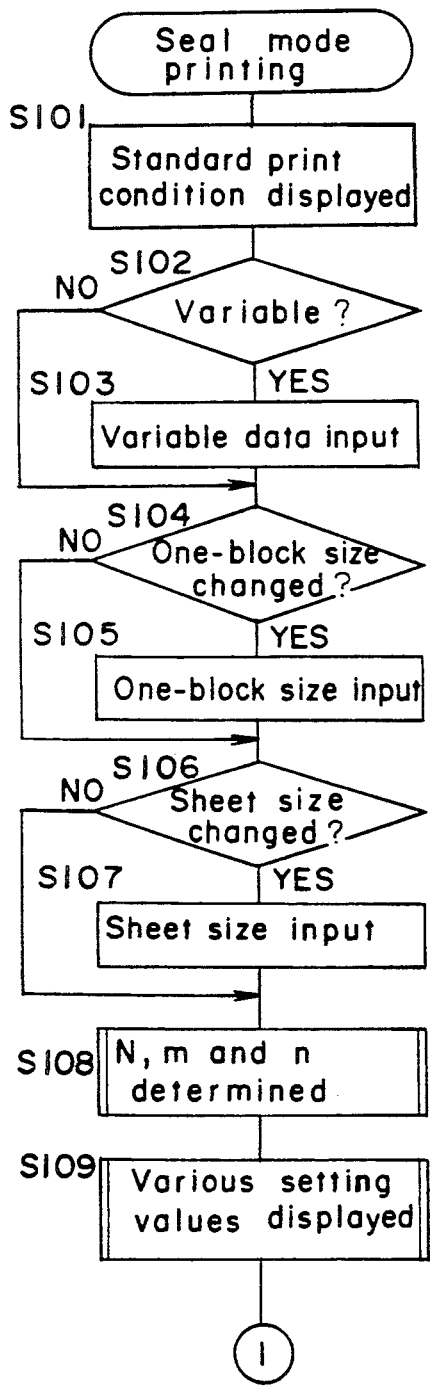
FIGS. 19(a) and 19(b) are flow charts each showing a seal mode process.
Figure 19B:
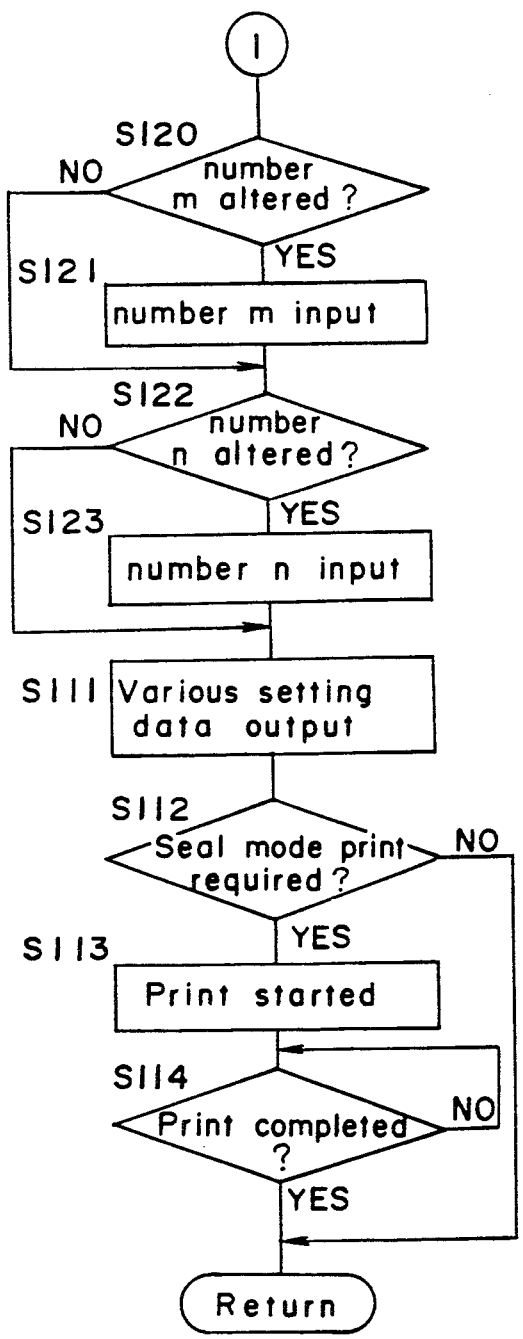

FIGS. 19a and 19b are flow charts of the seal mode printing process (step S7 in FIG. 17).

Referring to FIG. 19a, the initial standard printing conditions are displayed on the display portion 84 in step S101 (see FIG. 9). Next, it is judged in step S102 whether or not the change of the magnification is indicated in step S102. If the magnification is varied (YES in step S102), the input value Z of the variable magnification data is stored in the magnification data memory 93 (see FIG. 6) in step S103. Thereafter, it is judged in step S104 whether or not the change of the one-block size is indicated. If the one-block size is varied (YES in step S104), the input value S of the one-block size is stored in the one-block size memory 94 in step S105. Subsequently, in step S106, it is judged whether or not the change of the sheet size is indicated. If the sheet size is altered (YES in step S106), the sheet size is stored in the sheet size memory 95 in step S107.

Figure 20:
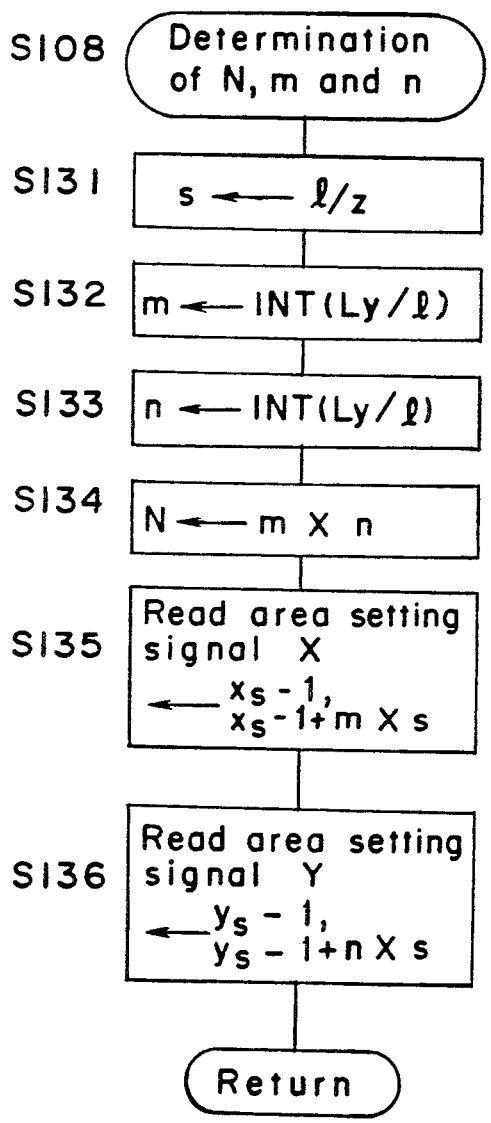

Next in step S108, depending on the magnification, one-block size and sheet size set as mentioned above, the numbers N, m and n of the images to be printed, i.e., the number of the seal images to be printed are determined (see FIG. 20).

Then, in step S109, as shown in FIG. 11, various setting values, the number of the seal images to be printed and the output format are displayed on the display portion 84 (see FIG. 21).

Subsequently, it is judged in step S120 whether or not the change of the number m of the images to be printed in the main scan direction is indicated. If the number m is altered (YES in step S120), the input value m of the print image number is stored in the image number memory 99 in step S121. Next in step S122, it is judged whether or not the change of the number n of the images to be printed in the sub-scan direction is indicated. If the number n is altered (YES in step S122), the input value n is stored in the image number memory 99 in step S123.

Subsequently, in step S111, various setting data such as read area setting signal, one-block size signal, offset amount data, variable magnification data, color adjustment coefficient and printing image number are outputted and sent to the image memory unit 1 and color tone setting unit 2.

Next in step S112, it is judged whether or not the seal mode image forming is required (see FIG. 8). If the seal mode image forming is required (YES in step S112), the print operation of the seal images is started in step S113. When the seal image printing operation is completed, the program returns.

FIG. 20 shows a flow chart of the determination of the number N, m and n of the images to be printed (step S108 shown in FIG. 19(a)). At this time, the sheet size and magnification data Z are predetermined by the operator. First, in step S131, depending on the one-block size l in the main scan and sub-scan directions, the one-block size S on the memory corresponding to the magnification Z is calculated from $1/Z$. Thereafter, the numbers m and n of the images to be printed in the main scan and sub-scan directions are respectively calculated by INT(Lx/l) and INT(Ly/l) in steps S132 and S133. Herein, INT(a) denotes the maximum integer not more than 'a', and Lx represents the difference of the sheet size subtracted by the size of the left space thereof in the main scan direction, and Ly represents the difference of the sheet size subtracted by the size of the upper space thereof in the sub-scan direction (see FIG. 10). Next in step S134, the whole number N of the images to be printed on the entire area of the sheet is calculated from m x n in step S134. Subsequently, the read area setting signals X ($x_s-1$, $x_s1+mxS$) set in the main scan direction and Y ($y_s-1$, $y_s-1+nxS$) set in the sub-scan direction are respectively calculated in steps S135 and S136.

FIG. 21 shows the flow chart of the display of the printing image number (see step S109 shown in FIG. 19(a)). The printing format (see FIG. 10) is calculated depending on the printing image number determined as mentioned above and the format is displayed on the left side of the display portion 84 in step S151. Thereafter, various printing conditions such as the sheet size, one-block size and magnification and the printing image number N, m and n are displayed on the right portion of the display portion 84 in step S152.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A digital color copying machine for forming a plurality of images on a copying sheet, said machine comprising:
    image reading means for scanning an original image and generating digitial image data;
    area indicating means for indicating a partial area of the original image;
    memory means for storing the image data corresponding to the partial area indicated by said area indicating means;
    input means for inputting the image data in said memory means;
    output means for reading out the image data from the memory means;
    means for indicating a size of the copying sheet;
    size setting means for setting a size of a unit image to be printed on the copying sheet;
    calculation means for calculating a maximum number of print images to be printed on the sheet depending on the sheet size and the unit image size; and
    printing means for repeatedly printing the image data read out by said output means on a plurality of sections on the copying sheet based on the calculation result calculated by said calculation means.

2. The digital color copying machine as defined in claim 1, further comprising magnification setting means for setting a magnification of the print image, wherein said calculation means calculates a maximum number of print images to be formed on the sheet based on the sheet size, unit image size and the magnification set by said magnification setting means.

3. The digital color copying machine as defined in claim 2, further comprising means for controlling an image data reading clock in said output means corresponding to the magnification set by said magnification setting means.

4. The digital color copying machine as defined in claim 2, further comprising means for controlling an image data input clock in said input means corresponding to the magnification set by said magnification setting means.

5. The digital color copying machine as defined in claim 1, further comprising display means for displaying the number of the images to be printed which is calculated by said calculation means.

6. The digital color copying machine as defined in claim 1, further comprising means for setting a read-out direction and read-out times of the image data stored in said memory means, wherein said output means reads out the image data based on the read-out direction and read-out times.

7. A digital color copying machine for forming a plurality of images on a copying sheet, said machine comprising:
    image reading means for scanning an original image and generating digital image data;
    area indicating means for indicating a partial area of the original image;
    memory means for storing the image data corresponding to the partial are indicated by said area indicating means;
    input means for inputting the image data in said memory means;
    setting means for setting a direction and times for repeatedly printing the same partial area of the original image on the copying sheet;
    output means for repeatedly reading out the image data from the memory means depending on the image printing direction and the times set by said setting means; and
    printing means for printing the image data read out by said output means on each of a plurality of sections on the copying sheet.

8. The digital color copying machine as defined in claim 7, further comprising image size setting means for setting a size of the image to be printed on the copying sheet, wherein said output means reads the image data in a range corresponding to the image size set by said image size setting means.

9. The digital color copying machine as defined in claim 1, further comprising means for amending the calculation result calculated by the calculation means.

* * * * *